United States Patent
Csefalvay

(10) Patent No.: US 11,922,321 B2
(45) Date of Patent: Mar. 5, 2024

(54) METHODS AND SYSTEMS FOR SELECTING QUANTISATION PARAMETERS FOR DEEP NEURAL NETWORKS USING BACK-PROPAGATION

(71) Applicant: Imagination Technologies Limited, Kings Langley (GB)

(72) Inventor: Szabolcs Csefalvay, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/119,762

(22) Filed: Mar. 9, 2023

(65) Prior Publication Data

US 2023/0214659 A1    Jul. 6, 2023

Related U.S. Application Data

(63) Continuation of application No. 16/724,650, filed on Dec. 23, 2019, now Pat. No. 11,610,127.

(30) Foreign Application Priority Data

Dec. 21, 2018   (GB) ..................... 1821150

(51) Int. Cl.
    *G06N 3/084*    (2023.01)
    *G06N 3/04*     (2023.01)
    (Continued)

(52) U.S. Cl.
    CPC ............ *G06N 3/084* (2013.01); *G06N 3/04* (2013.01); *G06N 3/06* (2013.01); *G06N 3/08* (2013.01)

(58) Field of Classification Search
    None
    See application file for complete search history.

(56) References Cited

U.S. PATENT DOCUMENTS 10,747,502 B2 *   8/2020  Pareek ................ G06F 9/3887
2016/0328646 A1 * 11/2016  Lin .................... G06N 3/04
(Continued)

FOREIGN PATENT DOCUMENTS

CN    106796668 A    5/2017
GB    2568084 A      5/2019
(Continued)

OTHER PUBLICATIONS

Guo, "A Survey on Methods and Theories of Quantized Neural Networks," arXiv:1808.04752 [cs.LG], Aug. 2018.
(Continued)

*Primary Examiner* — Jiangeng Sun
(74) *Attorney, Agent, or Firm* — Potomac Law Group, PLLC; Vincent M DeLuca

(57) ABSTRACT

Methods and systems for identifying quantisation parameters for a Deep Neural Network (DNN). The method includes determining an output of a model of the DNN in response to training data, the model of the DNN comprising one or more quantisation blocks configured to transform a set of values input to a layer of the DNN prior to processing the set of values in accordance with the layer, the transformation of the set of values simulating quantisation of the set of values to a fixed point number format defined by one or more quantisation parameters; determining a cost metric of the DNN based on the determined output and a size of the DNN based on the quantisation parameters; back-propagating a derivative of the cost metric to one or more of the quantisation parameters to generate a gradient of the cost metric for each of the one or more quantisation parameters; and adjusting one or more of the quantisation parameters based on the gradients.

20 Claims, 15 Drawing Sheets

(51) Int. Cl.
  *G06N 3/06* (2006.01)
  *G06N 3/08* (2023.01)

(56) References Cited

U.S. PATENT DOCUMENTS

| | | | |
|---|---|---|---|
| 2017/0286830 A1* | 10/2017 | El-Yaniv | G06N 3/045 |
| 2018/0107925 A1* | 4/2018 | Choi | G06F 17/16 |
| 2018/0107926 A1* | 4/2018 | Choi | G06N 3/047 |
| 2019/0138882 A1* | 5/2019 | Choi | G06N 3/048 |
| 2019/0340492 A1* | 11/2019 | Burger | G06N 3/08 |
| 2019/0340499 A1* | 11/2019 | Burger | G06N 3/084 |
| 2019/0347554 A1* | 11/2019 | Choi | G06N 3/082 |
| 2020/0097818 A1* | 3/2020 | Li | G06N 3/08 |
| 2020/0134499 A1* | 4/2020 | Ryu | G06N 7/01 |
| 2020/0193273 A1* | 6/2020 | Chung | G06F 17/16 |
| 2020/0193274 A1* | 6/2020 | Darvish Rouhani | G06N 3/045 |
| 2022/0083855 A1* | 3/2022 | Choi | G06F 18/2113 |

FOREIGN PATENT DOCUMENTS

| | | |
|---|---|---|
| WO | 2017/157112 A1 | 9/2017 |
| WO | 2019/086104 A1 | 5/2019 |
| WO | 2021-036362 A1 | 3/2021 |

OTHER PUBLICATIONS

"Array Broadcasting in Numpy," https://docs.scipy.org/doc/numpy/user/theory.broadcasting.html#array-broadcasting-in-numpy.

Courbariaux et al., "Binarized Neural Networks: Training Neural Networks with Weights and Activations Constrained to +1 or −1," arXiv:1602.02830 [cs.LG], Feb. 2016.

Zhou et al., "DoReFa-Net: Training Low Bitwidth Convolutional Neural Networks with Low Bitwidth Gradients," arXiv:1606.06160 [cs.NE], Jun. 2016.

Keckler et al., "GPUs and the Future of Parallel Computing," IEEE Computer Society, Sep. 2011.

Choi et al, "Learning Low Precision Deep Neural Networks through Regularization," arXiv:1809.00095 [cs.CV], Sep. 2018.

Frankle et al., "The Lottery Ticket Hypothesis: Finding Sparse, Trainable Neural Networks," arXiv:1803.03635 [cs.LG], Mar. 2019.

Zhu et al., "Trained Ternary Quantization," arXiv:1612.01064 [cs.LG], Feb. 2017.

Jain et al., "Trained Uniform Quantization for Accurate and Efficient Neural Network Inference on Fixed-Point Hardware," arXiv:1903.08066v1 [cs.CV], Mar. 2019.

Wu et al., "Training and Inference with Integers in Deep Neural Networks," arXiv:1802.04680v1 [cs.LG], Feb. 2018.

Li et al., "Visualizing the Loss Landscape of Neural Nets," 32nd Conference on Neural Information Processing Systems (NeurIPS 2018), Montreal, Canada.

Rastegari et al., "XNOR-Net: ImageNet Classification Using Binary Convolutional Neural Networks," arXiv:1603.0527v4 [cs.CV] Aug. 2016.

(note: NPL in parent application).

* cited by examiner

METHODS AND SYSTEMS FOR SELECTING QUANTISATION PARAMETERS FOR DEEP NEURAL NETWORKS USING BACK-PROPAGATION

CROSS-REFERENCE TO RELATED APPLICATIONS AND CLAIM OF PRIORITY

This application is a continuation under 35 U.S.C. 120 of application Ser. No. 16/724,650 filed Dec. 23, 2019, now U.S. Pat. No. 11,610,127, which claims foreign priority under 35 U.S.C. 119 from United Kingdom Application No. 1821150.8 filed Dec. 21, 2018.

BACKGROUND

A Deep Neural Network (DNN) is a form of artificial neural network comprising a plurality of interconnected layers that can be used for machine learning applications. In particular, a DNN can be used in signal processing applications, including, but not limited to, image processing and computer vision applications. FIG. 1 illustrates an example DNN 100 that comprises a plurality of layers 102-1, 102-2, 102-3. Each layer 102-1, 102-2, 102-3 receives input data, processes the input data in accordance with the layer to produce output data. The output data is either provided to another layer as the input data or is output as the final output data of the DNN. For example, in the DNN 100 FIG. 1 the first layer 102-1 receives the original input data 104 to the DNN 100 and processes the input data in accordance with the first layer 102-1 to produce output data. The output data of the first layer 102-1 becomes the input data to the second layer 102-2 which processes the input data in accordance with the second layer 102-2 to produce output data. The output data of the second layer 102-2 becomes the input data to the third layer 102-3 which processes the input data in accordance with the third layer 102-3 to produce output data. The output data of the third layer 102-3 is output as the output data 106 of the DNN.

The processing that is performed on the input data to a layer depends on the type of layer. For example, each layer of a DNN may be one of a plurality of different types. Example DNN layer types include, but are not limited to: a convolution layer, an activation layer, a normalisation layer, a pooling layer and a fully connected layer. It will be evident to a person of skill in the art that these are example DNN layer types and that this is not an exhaustive list and there may be other DNN layer types.

For a convolution layer, the input data is processed by convolving the input data using weights associated with that layer. Specifically, each convolution layer is associated with a plurality of weights $w_0 \ldots w_g$, which may also be referred to as filter weights or coefficients. The weights are grouped to form, or define, one or more filters, which may also be referred to as kernels, and each filter may be associated with an offset bias b.

Reference is made to FIG. 2 which illustrates an example overview of the format of data utilised in a DNN. As can be seen in FIG. 2, the data used in a DNN may be formed of a plurality of planes. For example, the input data may be arranged as P planes of data, where each plane has a dimension x×y. A DNN may comprise one or more convolution layers each of which has associated therewith a plurality of filters which comprise a plurality of weights. Each filter has a dimension m×n×P (i.e. each filter comprises a set of m×n×P weights w) and is applied to the input data according to a convolution operation across steps s and t in the x and y directions, as illustrated in FIG. 2. The number of filters and the number of weights per filter may vary between convolution layers. A convolutional neural network (CNN), which is a specific type of DNN that is effective for image recognition and classification, generally comprises a plurality of convolution layers.

An activation layer, which typically, but not necessarily follows a convolution layer, performs one or more activation functions on the input data to the layer. An activation function takes a single number and performs a certain non-linear mathematical operation on it. In some examples, an activation layer may act as rectified linear unit (ReLU) by implementing an ReLU function (i.e. $f(x)=\max(0, x)$) or a Parametric Rectified Linear Unit (PReLU) by implementing a PReLU function.

A normalisation layer is configured to perform a normalizing function, such as a Local Response Normalisation (LRN) Function on the input data. A pooling layer, which is typically, but not necessarily inserted between successive convolution layers, performs a pooling function, such as a max or mean function, to summarise subsets of the input data. The purpose of a pooling layer is thus to reduce the spatial size of the representation to reduce the number of parameters and computation in the network, and hence to also control overfitting.

A fully connected layer, which typically, but not necessarily follows a plurality of convolution and pooling layers takes a three-dimensional set of input data values and outputs an N dimensional vector. Where the DNN is used for classification N may be the number of classes and each value in the vector may represent the probability of a certain class. The N dimensional vector is generated through a matrix multiplication of a set of weights, optionally followed by a bias offset. A fully connected layer thus receives a set of weights and a bias.

Accordingly, as shown in FIG. 3, each layer 302 of a DNN receives input data values and generates output data values; and some layers (such as convolution layers and fully-connected layers) also receive weights and/or biases.

Hardware (e.g. a DNN accelerator) for implementing a DNN comprises hardware logic that can be configured to process input data to the DNN in accordance with the layers of the DNN. Specifically, hardware for implementing a DNN comprises hardware logic that can be configured to process the input data to each layer in accordance with that layer and generate output data for that layer which either becomes the input data to another layer or becomes the output of the DNN. For example, if a DNN comprises a convolution layer followed by an activation layer, hardware logic that can be configured to implement that DNN comprises hardware logic that can be configured to perform a convolution on the input data to the DNN using the weights and biases associated with that convolution layer to produce output data for the convolution layer, and hardware logic that can be configured to apply an activation function to the input data to the activation layer (i.e. the output data of the convolution layer) to generate output data for the DNN.

As is known to those of skill in the art, for hardware to process a set of values each value is represented in a number format. The two most suitable number formats are fixed point number formats and floating point number formats. As is known to those skilled in the art, a fixed point number format has a fixed number of digits after the radix point (e.g. decimal point or binary point). In contrast, a floating point number format does not have a fixed radix point (i.e. it can "float"). In other words, the radix point can be placed in multiple places within the representation. While representing values input to, and output from, the layers of a DNN in a floating point number format may allow more accurate or precise output data to be produced, processing values in a floating point number format in hardware is complex which tends to increase the silicon area, power consumption and complexity of the hardware compared to hardware that processes values in fixed point number formats. Accordingly, hardware for implementing a DNN may be configured to represent values input to the layers of a DNN in fixed point number formats to reduce the area, power consumption and memory bandwidth of the hardware logic.

Generally the fewer number of bits that can be used to represent values input to, and output from, the layer of a DNN the more efficiently the DNN can be implemented in hardware. However, typically the fewer bits that are used to represent values input to, and output from, the layers of a DNN the less accurate the DNN becomes. Accordingly it is desirable to identify fixed point number formats for representing the values of the DNN that balances the number of bits used to represent the values of the DNN and the accuracy of the DNN.

The embodiments described below are provided by way of example only and are not limiting of implementations which solve any or all of the disadvantages of methods and systems for identifying fixed point number formats for representing the values of a DNN.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for identifying quantisation parameters for a Deep Neural Network (DNN). The methods include determining an output of a model of the DNN in response to training data, the model of the DNN comprising one or more quantisation blocks configured to transform a set of values input to a layer of the DNN prior to processing the set of values in accordance with the layer, the transformation of the set of values simulating quantisation of the set of values to a fixed point number format defined by one or more quantisation parameters; determining a cost metric of the DNN based on the determined output and a size of the DNN based on the quantisation parameters; back-propagating a derivative of the cost metric to one or more of the quantisation parameters to generate a gradient of the cost metric for each of the one or more quantisation parameters; and adjusting one or more of the quantisation parameters based on the gradients.

A first aspect provides a computer-implemented method to identify one or more quantisation parameters for a Deep Neural Network "DNN" for implementing the DNN in hardware, the method comprising, in at least one processor: determining an output of a model of the DNN in response to training data, the model of the DNN comprising a quantisation block configured to transform a set of values input to a layer of the DNN prior to the model processing the set of values in accordance with the layer, the transformation of the set of values simulating quantisation of the set of values to a fixed point number format defined by one or more quantisation parameters; determining a cost metric of the DNN that is a combination of an error metric and a size metric, the error metric being a quantitative measure of an error in the determined output, and the size metric being proportional to a size of the DNN based on the one or more quantisation parameters; back-propagating a derivative of the cost metric to at least one of the one or more quantisation parameters to generate a gradient of the cost metric for the at least one of the one or more quantisation parameters; and adjusting the at least one of the one or more quantisation parameters based on the gradient for the at least one of the one or more quantisation parameters.

A second aspect provides A computing-based device to identify one or more quantisation parameters for a Deep Neural Network "DNN" for implementing the DNN in hardware, the computing-based device comprising: at least one processor; and memory coupled to the at least one processor, the memory comprising: computer readable code that when executed by the at least one processor causes the at least one processor to: determine an output of a model of the DNN in response to training data, the model of the DNN comprising a quantisation block configured to transform a set of values input to a layer of the DNN prior to the model processing the set of values in accordance with the layer, the transformation of the set of values simulating quantisation of the set of values to a fixed point number format defined by one or more quantisation parameters; determine a cost metric of the DNN that is a combination of an error metric and a size metric, the error metric being a quantitative measure of an error in the determined output, and the size metric being proportional to a size of the DNN based on the one or more quantisation parameters; back-propagate a derivative of the cost metric to at least one of the one or more quantisation parameters to generate a gradient of the cost metric for the at least one of the one or more quantisation parameters; and adjust the at least one of the one or more quantisation parameters based on the gradient for the at least one of the one or more quantisation parameters.

A third aspect provides hardware logic configured to implement a Deep Neural Network "DNN" in accordance with quantisation parameters identified in accordance with the first aspect.

The hardware logic configurable to implement a DNN (e.g. DNN accelerator) may be embodied in hardware on an integrated circuit. There may be provided a method of manufacturing, at an integrated circuit manufacturing system, the hardware logic configurable to implement a DNN (e.g. DNN accelerator). There may be provided an integrated circuit definition dataset that, when processed in an integrated circuit manufacturing system, configures the system to manufacture the hardware logic configurable to implement a DNN (e.g. DNN accelerator). There may be provided a non-transitory computer readable storage medium having stored thereon a computer readable description of hardware logic configurable to implement a DNN (e.g. DNN accelerator) that, when processed in an integrated circuit manufacturing system, causes the integrated circuit manufacturing system to manufacture an integrated circuit embodying hardware logic configurable to implement a DNN (e.g. DNN accelerator).

There may be provided an integrated circuit manufacturing system comprising: a non-transitory computer readable storage medium having stored thereon a computer readable description of hardware logic configurable to implement a DNN (e.g. DNN accelerator); a layout processing system configured to process the computer readable description so as to generate a circuit layout description of an integrated circuit embodying the hardware logic configurable to implement a DNN (e.g. DNN accelerator); and an integrated circuit generation system configured to manufacture the hardware logic configurable to implement a DNN (e.g. DNN accelerator) according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
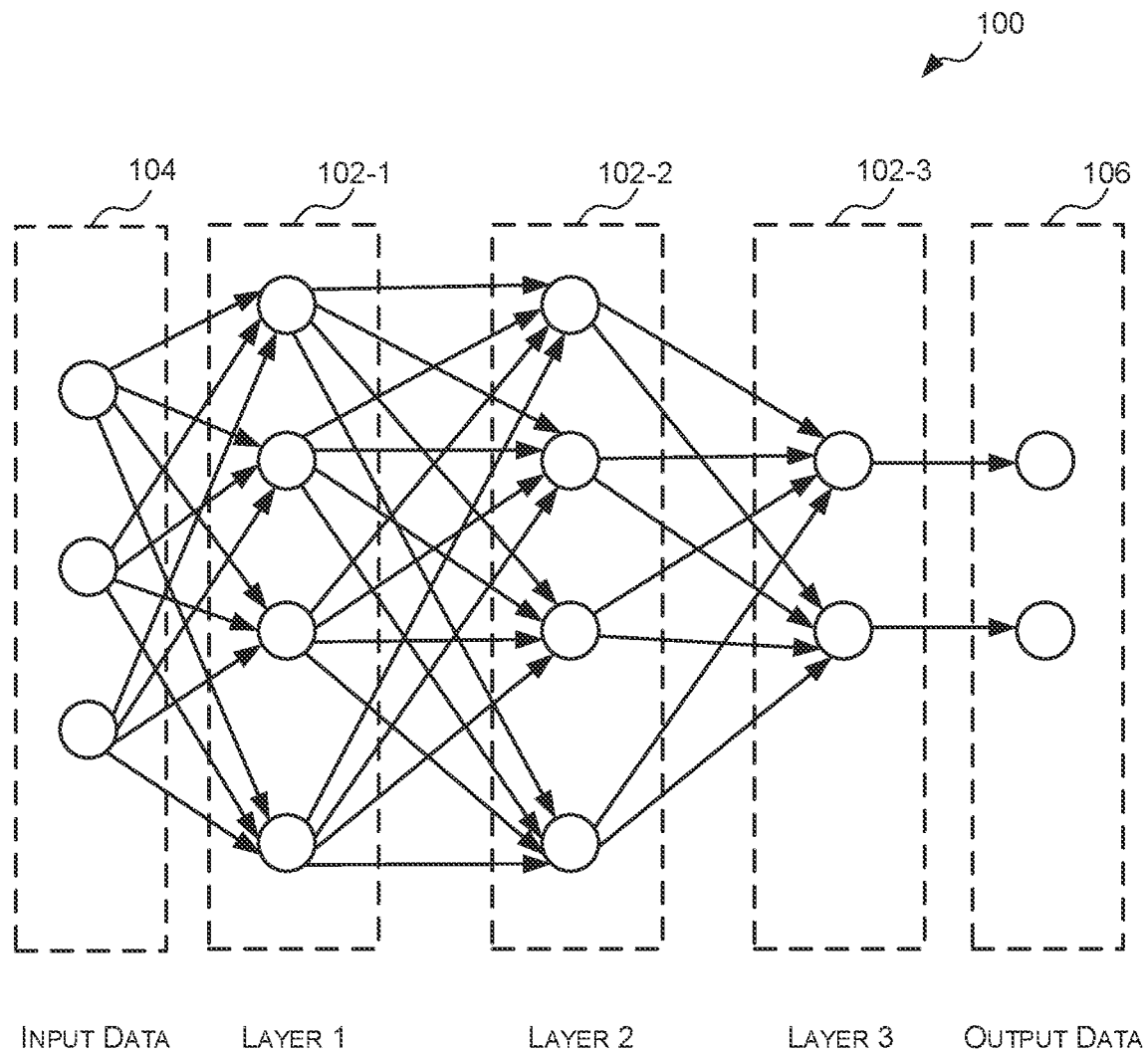
FIG. 1 is a schematic diagram of an example deep neural network (DNN)
Figure 2:
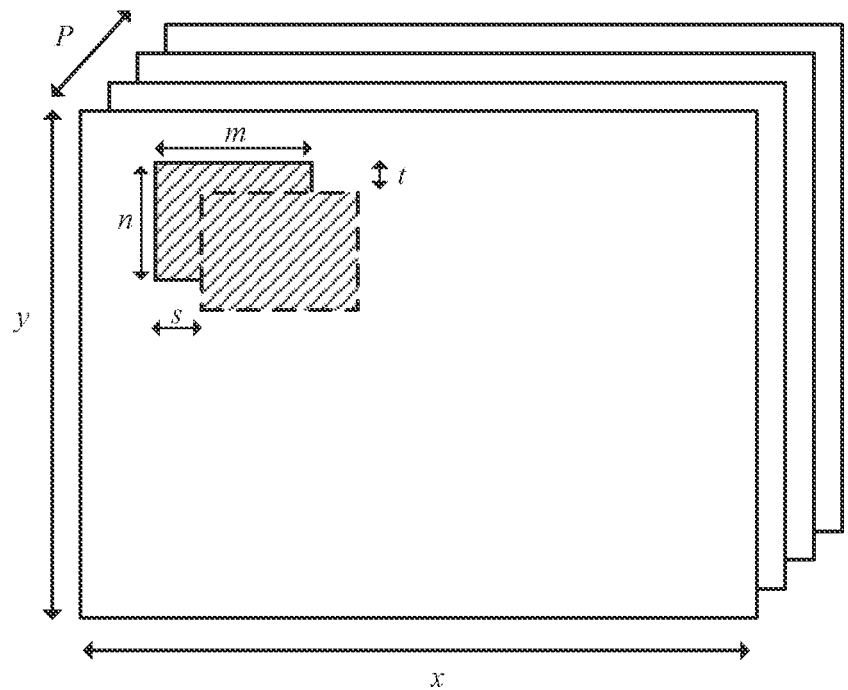
FIG. 2 is a schematic diagram of example data in a DNN.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Since the number of bits to efficiently represent a set of values is based on the range of values in the set, a DNN can be implemented efficiently without significantly reducing the accuracy thereof by dividing the values input to the DNN into sets and selecting fixed point number formats on a per set basis. Since values input to the same layer tend to be related each set may be all or a portion of a particular type of input to a layer. For example, each set may be all or a portion of the input data values of a layer; all or a portion of the weights of a layer; or all or a portion of the biases of a layer. Whether or not the sets comprise all or only a portion of a particular type of input to a layer may depend on the hardware that is to implement the DNN. For example, some hardware for implementing a DNN may only support a single fixed point number format per input type per layer, whereas other hardware for implementing a DNN may support multiple fixed point number formats per input type per layer.

Each fixed point number format is defined by one or more quantisation parameters. A common fixed point number format is the Q format, which specifies a predetermined number of integer bits a and fractional bits b. Accordingly, a number can be represented as Qa.b which requires a total of a+b+1 bits (including the sign bit). Example Q formats are illustrated in Table 1 below.

TABLE 1

| Q Format | Description | Example |
| --- | --- | --- |
| Q4.4 | 4 integer bits and 4 fractional bits | $0110.1110_2$ |
| Q0.8 | 0 integer bits and 8 fractional bits | $.01101110_2$ |

Where the Q format is used to represent values of a DNN the quantisation parameters may comprise, for each fixed point number format, the number of integer bits a and the number of fractional bits b.

In other cases, instead of using the Q format to represent values input to the layers of a DNN, fixed point number formats defined by a fixed integer exponent exp and a b-bit mantissa m such that a value z is equal to $z=2^{exp}m$ may be used. In some cases, the mantissa m may be represented in two's complement format. However, in other cases other signed or unsigned integer formats may be used. In these cases the exponent exp and the number b of mantissa bits only needs to be stored once for a set of values represented in that format. Where such a fixed point number formed is used to represent values of a DNN the quantisation parameters may comprise, for each fixed point number format, a mantissa bit length b (which may also be referred to herein as a bit width or bit length), and an exponent exp.

In yet other cases, the 8-bit asymmetric fixed point (Q8A) format may be used to represent values input to the layers of a DNN. This format comprises a minimum representable number $r_{min}$, a maximum representable number $r_{max}$, a zero point z, and an 8-bit number for each value which identifies a linear interpolation factor between the minimum and maximum numbers. In other cases, a variant of the Q8A format may be used in which the number of bits used to store the interpolation factor is variable (e.g. the number of bits used to store the interpolation factor may be one of a plurality of possible integers). The floating point value $d_{float}$ can be constructed from such a format as shown in equation (1) where b is the number of bits used by the quantised representation and z is the quantised zero point which will always map exactly back to 0.f. Where such a fixed point number format is used to represent values of a DNN the quantisation parameters may comprise, for each fixed point number format, the maximum representable number or value $r_{max}$, the minimum representable number or value $r_{min}$, the quantised zero point z, and optionally, a mantissa bit length b (i.e. when the bit length is not fixed at 8).

$$d_{float} = \frac{(r_{max} - r_{min})(d_{QSA} - z)}{2^b - 1} \quad (1)$$

While a fixed point number format (and more specifically the quantisation parameters thereof) for efficiently representing a set of values may be determined simply from the range of values in the set, since the layers of a DNN are interconnected a better trade-off between the number of bits used for representing the values of the DNN and the performance (e.g. accuracy) of the DNN may be achieved by taking into account the interaction between layers when selecting the fixed point number formats (and more specifically the quantisation parameters thereof) for representing the values of a DNN.

Accordingly, described herein are methods and systems for identifying fixed point number formats, and specifically the quantisation parameters (e.g. exponents and mantissa bit lengths) thereof, for representing the values of a DNN using back-propagation. As is known to those of skill in the art, back-propagation is a technique that may be used to train a DNN. Training a DNN comprises identifying the appropriate weights to configure the DNN to perform a specific function.

Specifically, to train a DNN via back-propagation, a model of the DNN is configured to use a particular set of weights, training data is then applied to the model, and the output of the model in response to the training data is recorded. A differentiable error metric is then calculated from the recorded output which quantitatively indicates the performance of the DNN using that particular set of weights. In some cases, the error metric may be the distance (e.g. mean squared distance) between the recorded output and the expected output for that training data. However, this is only an example and any suitable error metric may be used. The derivative of the error metric is then back-propagated to the weights of the DNN to produce gradients/derivatives of the error metric with respect to each weight. The weights are then adjusted based on the gradients so as to reduce the error metric. This process may be repeated until the error metric converges.

DNNs are often trained using a model of the DNN in which the values of the DNN (e.g. input data values, weights and biases) are represented and processed in floating point number formats. A DNN that uses floating point number formats to represent and process the values of the DNN is referred to herein as a floating point DNN. A model of a floating point DNN may be referred to herein as a floating point model of the DNN. However, as described above, hardware (e.g. a DNN accelerator) for implementing a DNN may use fixed point number formats to represent the values of the DNN (e.g. input data values, weights and biases) to reduce the size and efficiency of the hardware. A DNN that uses fixed point number formats for at least some of the values thereof is referred to herein as a fixed point DNN. To train a fixed point DNN, quantisation blocks may be added to the floating point model of the DNN which quantise the values of the DNN to predetermined fixed point number formats prior to processing the values. This allows the quantisation of the values to fixed point number formats to be taken into account when training the DNN. A model of a DNN that comprises one or more quantisation blocks to quantise a set of input values is referred to herein as a quantising model of the DNN.

Figure 4:
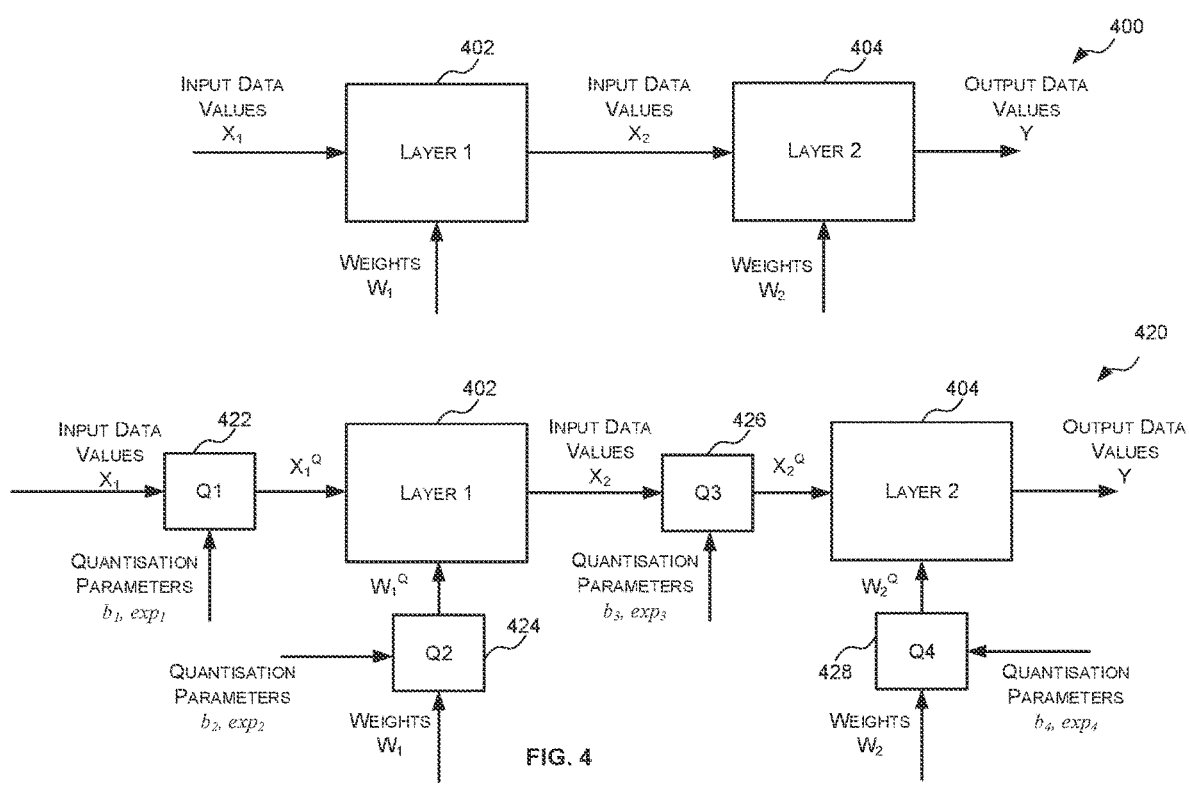
FIG. 4 is a schematic diagram illustrating an example model of a DNN with and without quantisation blocks.

For example, FIG. 4 shows an example DNN 400 that comprises a first layer 402 which processes a first set input data values $X_1$ in accordance with a first set of weights $W_1$; and a second layer 404 which processes a second set of input data values $X_2$ (the output of the first layer 402) in accordance with a second set of weights $W_2$. A floating point model of such a DNN 400 may be augmented with one or more quantisation blocks that each quantise a set of inputs values to a layer of the DNN so that the quantisation of the values of the DNN may be taken into account in training the DNN. For example, as shown in FIG. 4 a quantising model 420 of the DNN may be generated from a floating point model of the DNN by adding a first quantisation block 422 that quantises the first set of input data values $X_1$ to a fixed point number format defined by a first set of quantisation parameters (e.g. $b_1$, $exp_1$), a second quantisation block 424 that quantises the first set of weights $W_1$ to a fixed point number format defined by a second set of quantisation parameters (e.g. $b_2$, $exp_2$), a third quantisation block 426 that quantises the second set of input data values $X_2$ to a fixed point number format defined by a third set of quantisation parameters (e.g. $b_3$, $exp_3$) and a fourth quantisation block 428 that quantises the second set of weights $W_2$ to a fixed point number format defined by a fourth set of quantisation parameters (e.g. $b_4$, $exp_4$).

The inventors have identified that adding quantisation blocks to the floating point model of the DNN allows the quantisation parameters (e.g. mantissa bit lengths and exponents) themselves to be determined via back-propagation so long as the quantisation parameters are differentiable. Specifically, this can be achieved by making the quantisation parameters (e.g. bit lengths b and exponents exp) learnable and generating a cost metric based on the error metric and the size of the DNN (based on the total number of bits to implement the DNN). The derivative of the cost metric can then be back-propagated to the quantisation parameters (e.g. bit depths b and exponents exp) to produce gradients/derivatives of the cost metric with respect to each of the quantisation parameters. Each gradient indicates whether the corresponding quantisation parameter (e.g. bit depth or exponent) should be higher or lower than it is now to reduce the cost metric. The quantisation parameters may then be adjusted based on the gradients to minimise the cost metric. Similar to training a DNN (i.e. identifying the weights of a DNN), this process may be repeated until the cost metric converges.

Testing has shown that identifying the quantisation parameters of a DNN using back-propagation can generate fixed point DNNs with a good level of performance (e.g. with an accuracy above a predetermined threshold) yet with a minimum number of bits, which allows the DNN to be implemented efficiently in hardware.

Figure 5:
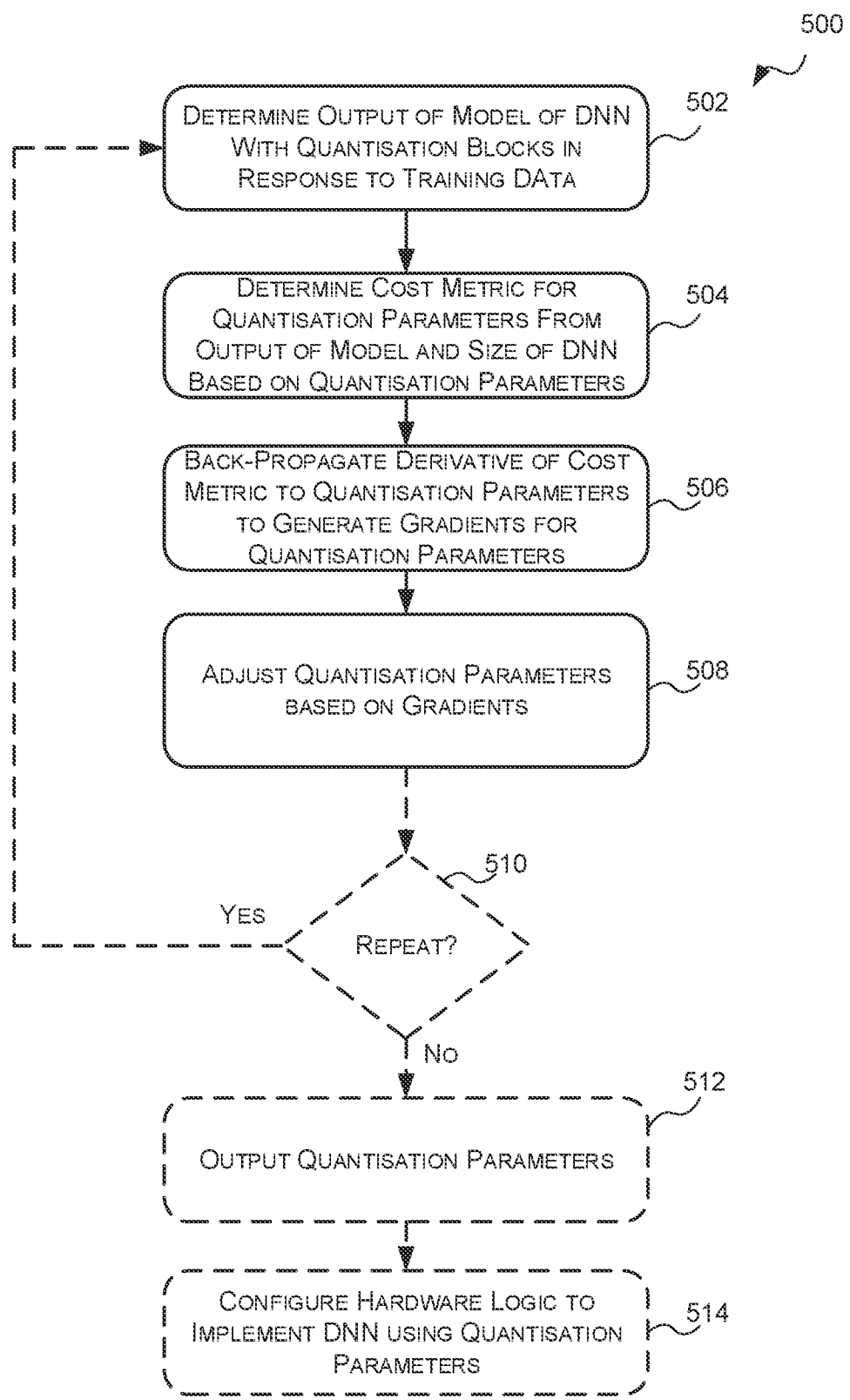
FIG. 5 is a flow diagram of an example method for identifying quantisation parameters for a DNN.

Reference is now made to FIG. 5 which illustrates an example method 500 for identifying quantisation parameters of a DNN via back-propagation. The method 500 may be implemented by a computing-based device such as the computing-based device 1300 described below with respect to FIG. 13. For example, there may be computer readable storage medium having stored thereon computer readable instructions that, when executed at a computing-based device, cause the computing-based device to perform the method 500 of FIG. 5.

The method begins at block 502 where the output of a quantising model of the DNN in response to training data is determined. A model of a DNN is a representation of the DNN that can be used to determine the output of the DNN in response to input data. The model may be, for example, a software implementation of the DNN or a hardware implementation of the DNN. Determining the output of a model of the DNN in response to training data comprises passing the training data through the layers of the DNN and obtaining the output thereof. This may be referred to forward-propagation of the DNN because the calculation flow is going from the input through the DNN to the output. The model may be configured to use a trained set of weights (e.g. a set of weights obtained through training a floating point model of the DNN).

A quantising model of the DNN is a model of the DNN that comprises one or more quantisation blocks that are configured to quantise a set of values input to a layer of the DNN to one or more fixed point formats prior to being processed by that layer. The quantisation blocks allow the effect of quantising one or more sets of values of the DNN on the output of the DNN to be measured.

As is known to those of skill in the art, quantisation is the process of converting a number in a higher precision number format to a lower precision number format. Quantising a number in a higher precision format to a lower precision format generally comprises selecting one of the representable numbers in the lower precision format to represent the number in the higher precision format based on a particular rounding mode (such as, but not limited to round to nearest (RTN), round to zero (RTZ), ties to even (RTE), round to positive infinity (RTP), and round to negative infinity (RTNI)).

For example, equation (2) sets out an example formula for quantising a value z in a first number format into a value $z^q$ in a second, lower precision, number format where $X_{max}$ is the highest representable number in the second number format, $X_{min}$ is the lowest representable number in the second number format, and RND(z) is a rounding function:

$$z^q = \begin{cases} X_{max}, \text{ if } z \geq X_{max} \\ X_{min}, \text{ if } z \leq X_{min} \\ 0, \text{ if } z = 0 \\ RND(z), \text{ otherwise} \end{cases} \quad (2)$$

The formula set out in equation (1) quantises a value in a first number format to one of the representable numbers in the second number format selected based on the rounding mode RND (e.g. RTN, RTZ, RTE, RTP or RTNI).

In the examples described herein, the lower precision format is a fixed point number format and the higher precision format may be a floating point number format or a fixed point number format. In other words, each quantisation block is configured to receive a set of values in an input number format, which may be a floating point number format or a fixed point number format, and quantise the set of values to a, lower precision, output fixed point number format.

Figure 3:
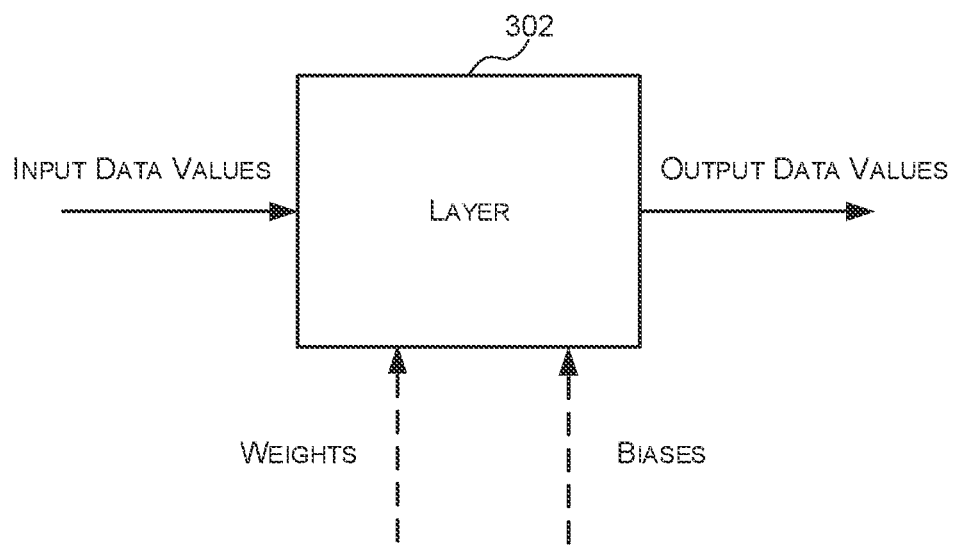
FIG. 3 is a schematic diagram illustrating the data input to, and output from, a layer of a DNN.

As described above with respect to FIG. 3, each layer to a DNN receives input data values and produces output data values. A layer may also receive weights and/or biases. Accordingly, the set of values quantised by any quantisation block may be all or a subset of the input data values of a layer, all or a subset of the weights of a layer, or all or a subset of the biases of a layer. For example, as shown in FIG. 4, a quantising model 420 of a DNN may comprise a first quantisation block 422 that quantises the input data values to a first layer 402 to a first output fixed point number format, a second quantisation block 424 that quantises the weights of the first layer to a second output fixed point number format, a third quantisation block 426 that quantises the input data values to a second layer 404 to a third output fixed point number format, and a fourth quantisation 428 block that quantises the weights of the second layer 404 to a fourth output fixed point number format. It will be evident to a person of skill in the art that this is an example only, and in other examples there may be a different number of quantisation blocks and they may be configured in a different manner. For example, in some cases, one or more of the quantisation blocks may be configured to quantise different subsets of values of a particular input type to different output fixed point number formats. For example, a quantisation block may quantise a first subset of the input values to a layer to a first output fixed point number format and quantise a second subset of the input values to that layer to a second, different, output fixed point number format. In other cases there may be multiple quantisation blocks per input type. For example there may be a plurality of quantisation blocks for quantising the weights of a layer wherein each of these quantisation blocks quantise only a portion (or only a subset) of the weights of the layer. Whether or not different subsets of the values of a particular input type (e.g. input data values, weights or biases) of a layer can be quantised to different output fixed point number formats may depend on the hardware that is to implement the DNN. For example, some hardware logic that can implement a DNN may only support a single fixed point number format per input type per layer whereas other hardware (such as the DNN accelerator described below) may support multiple fixed point number formats per input type per layer.

Each output fixed point number format used by a quantisation block is defined by one or more quantisation parameters. The quantisation parameters that define a particular output fixed point number format may be based on the particular fixed point number formats supported by the hardware logic that is to implement the DNN. For example, where the hardware logic to implement the DNN supports Q formats each fixed point number format may be defined by the number of integer bits and the number of fractional bits. In other cases, each fixed point number format may be defined by an exponent exp and a mantissa bit length b; or by a minimum representable value $r_{min}$, a maximum representable value $r_{max}$, a zero point z, and optionally, a bit length b.

In the first iteration of block 502 the quantisation parameters that are used by the quantisation blocks may be randomly selected from the supported quantisation parameters or they may be selected in another manner. For example, in some cases the mantissa bit lengths may be set to a value higher than the highest bit length supported by the hardware which is to be used to implement the DNN so that information is not lost by the initial quantisation. For example, where the hardware that is to be used to implement the DNN supports a maximum bit length of 16 bits then the mantissa bit lengths may be initially set to a value higher than 16 (e.g. 20).

Example implementations of the quantisation blocks will be described below.

Once the output of the model of the DNN in response to training data has been determined the method 500 proceeds to block 504.

At block 504, a cost metric cm for the set of quantisation parameters used in block 502 is determined from (i) the output of the quantising model of the DNN in response to the training data and (ii) the size of the DNN based on the set of quantisation parameters. The cost metric cm is a quantitative measurement of the quality of the set of quantisation parameters. In the examples described herein, the quality of a set of quantisation parameters is based on the error of the DNN when the set of quantisation parameters are used to quantise the values of the DNN, and the size (e.g. number of bits) of the DNN when that set of quantisation parameters are used. Accordingly, in some cases the cost metric cm may be a combination of an error metric em and a size metric sm. In some examples, the cost metric cm may be calculated as the weighted sum of the error metric em and the size metric sm as shown in equation (3) wherein α and β are the weights applied to the error metric em and the size metric sm respectively. The weights α and β are selected to achieve a certain balance between the error and size metrics. In other words the weights are used to indicate which is more important—error or size. For example, if the size metric weight β is small the cost metric will be dominated by the error metric leading to a more accurate network. In contrast, if the size metric weight β is large the cost metric will be dominated by the size metric leading to a smaller network with lower accuracy. However, in other examples the error metric em and the size metric sm may be combined in another suitable manner to generate the cost metric cm.

$$cm = (\alpha * em) + (\beta * sm) \quad (3)$$

Figure 6:
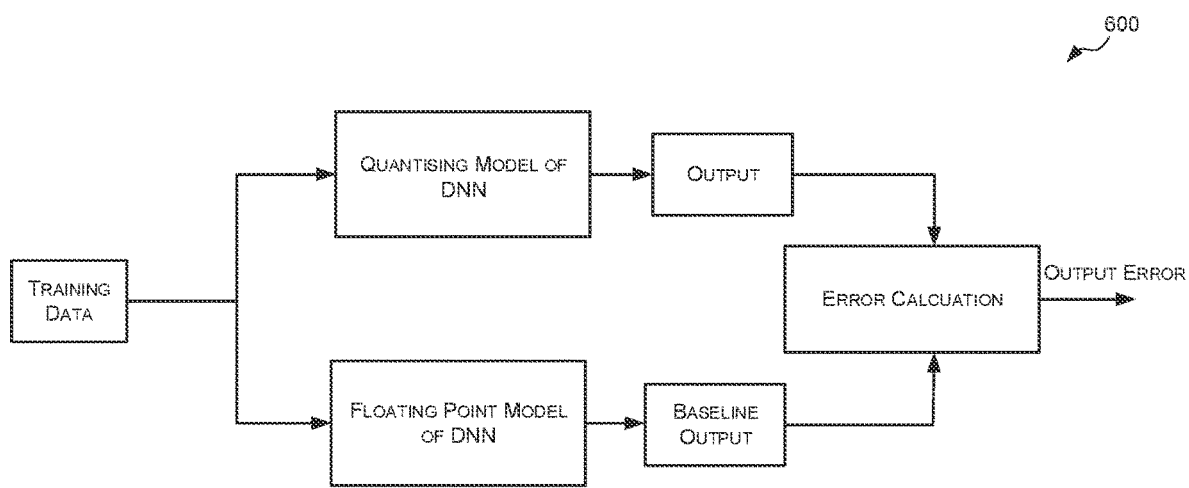
FIG. 6 is a schematic diagram illustrating a first example method for generating an error metric.

The error metric em is any metric that provides a quantitative measure of the error in the output of the quantising model of the DNN when a particular set of quantisation parameters are used to quantise the values of the DNN. In some examples, the error in the output of the quantising model of the DNN in response to the training data may be calculated as the error in the output with respect to a baseline output. In some cases, as shown at 600 of FIG. 6, the baseline output may be the output of a floating point model of the DNN (i.e. a model of the DNN in which the values of the DNN are in floating point number formats). Since values can generally be represented more accurately, or more precisely, in a floating point number format a floating point model of the DNN represents a model of the DNN that will produce the most accurate output. Accordingly, the output generated by a floating point model of the DNN may be used as the benchmark or baseline output from which to gauge the accuracy of output data generated by the quantising model of the DNN.

Figure 7:
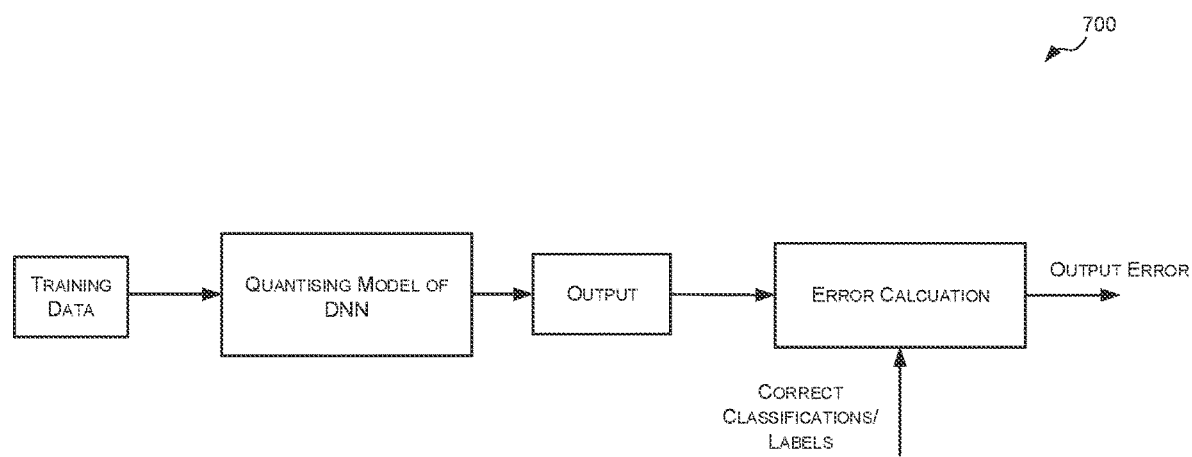
FIG. 7 is a schematic diagram illustrating a second example method for generating an error metric.

In other examples, as shown at 700 of FIG. 7, the baseline output may be the ground truth output for the training data. In these examples, the error in the output of the quantising model of the DNN may indicate the accuracy of the output of the quantising model of the DNN relative to known results for the training data.

The error between the baseline output and the output of the quantising model of the DNN may be determined in any suitable manner. Where the DNN is a classification network the output of the DNN may be a set of logits. As is known to those of skill in the art, a classification network determines the probability that the input data falls into each of a plurality of classes. A classification DNN generally outputs a data vector with one element corresponding to each class, and each of these elements is called a logit. For example, a classification network with 1425 potential class labels may output a vector of 1425 logits. In these cases, the error between the baseline output and the output of the quantising model of the DNN may be calculated as the L1 distance between corresponding logits. This is illustrated in equation (4) where r is the set of logits in the baseline output and r' is the set of logits in the output of the quantising model of the DNN:

$$em = \Sigma_i |r_i - r'_i| \quad (4)$$

In other examples, the output of a classification DNN may instead be the output of a SoftMax function applied to the logits. As is known to those of skill in the art, the SoftMax function is a transformation applied to the logits output by a DNN so that the values associated with each classification add up to 1. This allows the output of the SoftMax function to represent a probability distribution over the classes. The output of the SoftMax function may be referred to as the SoftMax normalised logits. The SoftMax function can be expressed as shown in equation (5) (with or without an additional temperature parameter T) where $s_i$ is the softmax output for class i, $r_i$ is the logit for class i, and i and j are vector indices corresponding to the classes. Increasing the temperature T makes the SoftMax values "softer" (i.e. less saturation to 0 and 1) and thereby easier to train against.

$$s_i(r; T) = \frac{e^{r_i/T}}{\sum_j e^{r_j/T}} \quad (5)$$

Where the output of a classification DNN is a set of SoftMax normalised logits the error between the baseline output and the output of the quantising model of the DNN may be calculated as the L1 distance between the outputs of the SoftMax function.

In other cases, the error in the output of the quantising model of the DNN in response to the training data may be the Top-N classification accuracy wherein N is an integer greater than or equal to one. As is known to those of skill in the art, the Top-N classification accuracy is a measure of how often the correct classification is in the top N classifications output by the DNN. Popular Top-N classification accuracies are Top-1 and Top-5 classification accuracies, but any Top-N classification accuracy may be used.

In general, a DNN will be trained (i.e. the weights thereof selected) in accordance with an error metric and it is advantageous to use the same error metric used in training to select the quantisation parameters.

The size metric sm is any metric that provides a quantitative measure of the hardware-related costs of implementing the DNN when a particular set of quantisation parameters are used. The hardware-related costs of implementing the DNN may comprise, for example, the cost of transferring data from the memory to an NNA chip. The size metric may be expressed, for example, in physical units (e.g. Joules) or in information unit (e.g. bits or bytes). Specifically, in some cases the hardware-related cost of implementing the DNN may be proportional to the size of the DNN, wherein the size of the DNN is the number of bits or bytes used to represent the values of the DNN (e.g. input data values, weights and biases). In these cases, where the output fixed point number formats used by the quantisation blocks are defined by the number of mantissa bits b and an exponent exp and the exponent exp is shared by the set of values that are represented in the fixed point number format, the size metric sm may be calculated in accordance with equation (6) where $b_i$ is the mantissa bit length for the $i^{th}$ set of values that are quantised and $num_i$ is the number of values in the $i^{th}$ set of values and j is the number of sets of values that are quantised:

$$sm = \sum_{i=1}^{j} b_i * num_i \qquad (6)$$

In other cases the number of values in each set may be ignored so that the size metric is calculated in accordance with equation (7).

$$sm = \sum_{i=0}^{j} b_i \qquad (7)$$

Once the cost metric cm for the set of quantisation parameters has been determined the method 500 proceeds to block 506.

At block 506, the derivative of the cost metric cm is back-propagated to one or more quantisation parameters to generate a gradient of the cost metric with respect to each of the one or more quantisation parameters.

As is known to those of skill in the art, the derivative of a function at a particular point is the rate or speed at which the function is changing at that point. A derivative is decomposable thus can be back-propagated to the parameters of a DNN to generate a derivative or gradient of the cost metric with respect to those parameters. As described above, back-propagation (which may also be referred to as backwards propagation of errors) is a method used in training of DNNs to calculate the gradient of an error metric with respect to the weights of the DNN. The Applicant submits that back-propagation can also be used to determine the derivative of the cost metric cm with respect to the quantisation parameters (e.g. bit-widths b and exponents exp)

$$\left(\frac{\partial cm}{\partial qp_i}\right).$$

Figure 8:
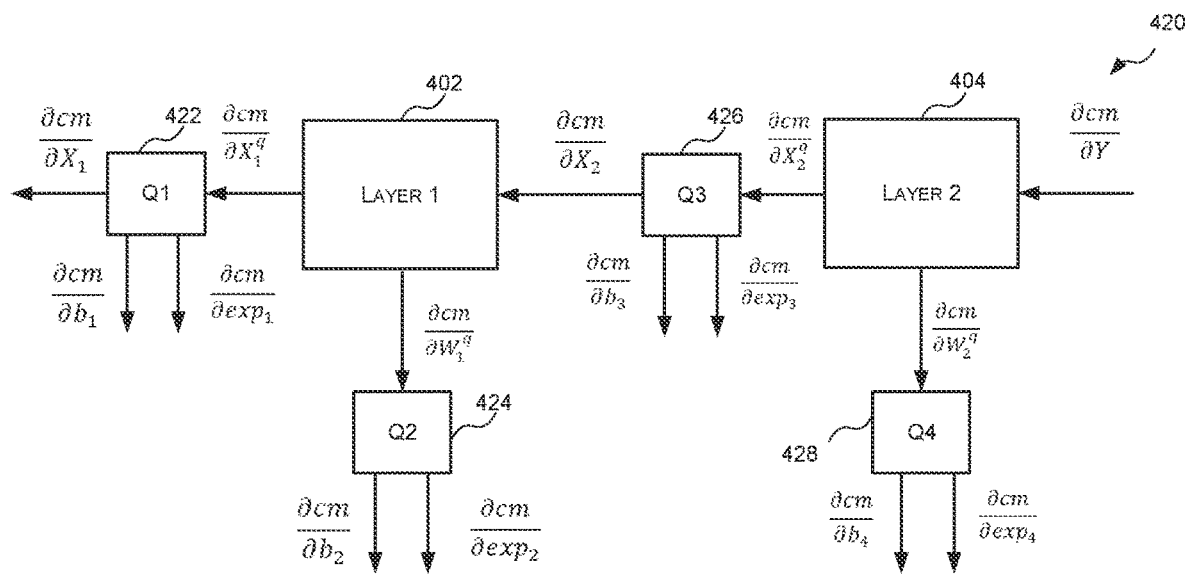
FIG. 8 is a schematic diagram illustrating back-propagation of the cost metric to the quantisation parameters of an example DNN.

For example, FIG. 8 illustrates back-propagation of the cost metric cm to the quantisation parameters (e.g. bit-widths b and exponents exp) of the DNN of FIG. 4. In particular, the derivate of the cost metric cm with respect to the second and third bit widths $b_3$ and $b_4$ can be calculated as shown in equations (8) and (9) respectively. The back-propagation of the derivative of the cost metric cm to the quantisation parameters may be performed, for example, using any suitable tool for training a DNN using back-propagation such as, but not limited to, TensorFlow™.

$$\frac{\partial cm}{\partial b_3} = \frac{\partial cm}{\partial Y} * \frac{\partial Y}{\partial X_2^q} * \frac{\partial X_2^q}{\partial b_3} \qquad (8)$$

$$\frac{\partial cm}{\partial b_4} = \frac{\partial cm}{\partial Y} * \frac{\partial Y}{\partial X_2^q} * \frac{\partial X_2^q}{\partial X_2} * \frac{\partial X_2}{\partial W_1^q} * \frac{\partial W_1^q}{\partial b_4} \qquad (9)$$

Figure 9:
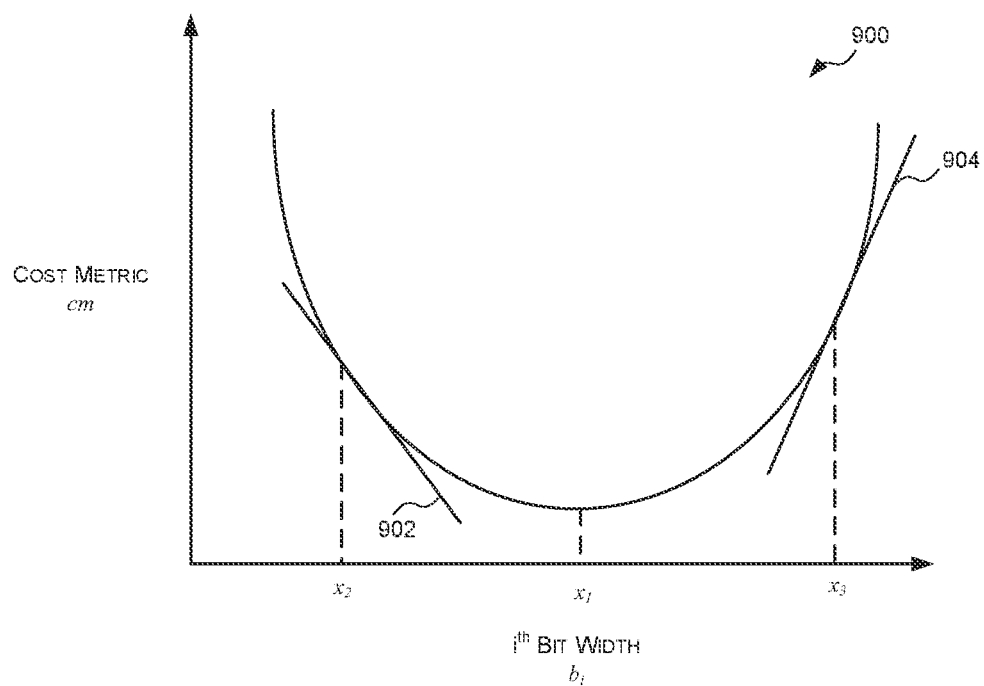
FIG. 9 is a graph illustrating the example gradients of an example cost metric with respect to a bit width.

The gradient of the cost metric with respect to a particular quantisation parameter $$\left(\frac{\partial cm}{\partial qp_i}\right)$$

indicates which direction to move the quantisation parameter to reduce the cost metric cm. Specifically, a positive gradient indicates that the cost metric cm can be reduced by reducing the quantisation parameter; and a negative gradient indicates that the cost metric cm can be reduced by increasing the quantisation parameter. For example, FIG. 9 shows a graph 900 of an example cost metric cm with respect to a particular bit-width $b_i$. The graph 900 shows that the lowest cost metric is achieved when the bit width $b_i$ has a first value $x_1$. It can be seen from the graph 900 that when the bit width $b_i$ is less than $x_1$ (e.g. when it has a second value $x_2$) it has a negative gradient 902 and the cost metric cm can be reduced by increasing the bit width $b_i$. Similarly, when the bit width $b_i$ is greater than $x_1$ (e.g. when it has a third value $x_3$) it has a positive gradient 904 and the cost metric cm. The gradient of the cost metric cm with respect to a particular quantisation parameter may be referred to herein as the gradient for the quantisation parameter.

Once the derivative of the cost metric has been back-propagated to one or more quantisation parameters to generate a gradient of the cost metric for each of those quantisation parameters the method 500 proceeds to block 508.

At block 508, one or more of the quantisation parameters (e.g. bit widths $b_i$ and exponents $exp_i$) are adjusted based on the gradients. The objective of the method 500 is to identify the set of quantisation parameters that will produce the 'best' cost metric. What constitutes the 'best' cost metric will depend on the how the cost metric is calculated. For example, in some cases the lower the cost metric the better the cost metric, whereas in other cases the higher the cost metric the better the cost metric.

As described above, the sign of the gradient for a quantisation parameter indicates whether the cost metric will be decreased by increasing or decreasing the quantisation parameter. Specifically, if the gradient for a quantisation parameter is positive a decrease in the quantisation parameter will decrease the cost metric; and if the gradient for a quantisation parameter is negative an increase in the quantisation parameter will decrease the cost metric. Accordingly, adjusting a quantisation parameter may comprise increasing or decreasing the quantisation parameter in accordance with the sign of the gradient so as to increase or decrease the cost metric (depending on whether it is desirable to increase or decrease the cost metric). For example, if a lower cost metric is desirable and the gradient for the quantisation parameter is negative then the quantisation parameter may be increased in an effort to decrease the cost metric. Similarly, if a lower cost metric is desirable and the gradient for the quantisation parameter is positive then the quantisation parameter may be decreased in an effort to decrease the cost metric.

In some cases, the amount by which the quantisation parameter is increased or decreased may be based on the magnitude of the gradient. In particular, in some cases the quantisation parameter may be increased or decreased by the magnitude of the gradient. For example, if the magnitude of the gradient is 0.4 then the quantisation parameter may be increased or decreased by 0.4. In other cases, the quantisation parameter may be increased or decreased by a factor of the magnitude of the gradient.

More generally when the objective is to decrease the cost metric cm the adjusted quantisation parameter ($qp_{adj}$) may be generated by subtracting the gradient for that quantisation parameter ($g_{qp}$) from the quantisation parameter (qp) as shown in equation (10). In some cases, it may be possible to adjust the rate at which different quantisation parameters are adjusted by multiplying the gradient by a learning rate l as shown in equation (11). The higher the learning rate the faster the quantisation parameter will be adjusted. The learning rate can be different for different quantisation parameters.

$$qp_{adj}=qp-g_{qp} \quad (10)$$

$$qp_{adj}=qp-l*g_{qp} \quad (11)$$

Typically hardware to implement a DNN can only support integer bit widths $b_i$ and exponents $exp_i$ and in some cases may only support a particular set of integer values for the bit widths and/or exponents. For example, the hardware logic that is to implement the DNN may only support bit widths of 4, 5, 6, 7, 8, 10, 12 and 16. Therefore before a quantisation parameter is used to implement the DNN in hardware the quantisation parameter is rounded to the nearest integer or the nearest integer in the set of supported integers. For example, if the optimum bit width is determined to be 4.4 according to the method the bit width may be quantised (e.g. rounded) to the nearest (RTN) integer (4 in this case) before it is used to implement the DNN in hardware.

Accordingly, in some cases, to take into account the quantisation (e.g. rounding) of the quantisation parameters that occurs when the DNN is implemented in hardware, when identifying the 'best' quantisation parameters, the increased/decreased quantisation parameters may be rounded to the nearest integer or to the nearest integer of a set of integers before the increased/decreased quantisation parameters are used in the next iteration as shown in equation (12) where RTN is the round to nearest integer function and $qp_{adj}^r$ is the increased/decreased quantisation parameter after it has been rounded to the nearest integer. For example, after a particular bit width is increased or decreased in accordance with the gradient associated therewith, the increased or decreased bit width may be rounded to the nearest integer, or the nearest of the set {4, 5, 6, 7, 8, 10, 12, 16} before it is used in the next iteration.

$$qp_{adj}^r=RTN(qp_{adj}) \quad (12)$$

In other cases, instead of actually quantising (e.g. rounding) the quantisation parameters after they have been increased/decreased, the transformation that the quantisation (e.g. rounding) of a quantisation parameter represents may be merely simulated. For example, in some cases, instead of rounding an increased/decreased quantisation parameter to the nearest integer, or nearest integer in a set, the quantisation may be simulated by performing stochastic quantisation on the increased/decreased quantisation parameter. Performing stochastic quantisation on the increased/decreased quantisation parameter may comprise adding a random value u between −a and +a to the increased/decreased quantisation parameter to generate a randomised quantisation parameter, where a is half the distance between (i) the closest integer in the set to the increased/decreased quantisation parameter that is less that the increased/decreased quantisation parameter and (ii) the closest integer in the set to the increased/decreased quantisation parameter that is greater than the increased/decreased quantisation parameter; and then setting the randomised quantisation parameter to the nearest of these two closest integers. When stochastic quantisation is used to simulate rounding to the nearest integer then a is equal to 0.5 and the stochastic quantisation may be implemented as shown in equation (13) where RTN is the round to nearest integer function and $qp_{adj}^s$ is the increased/decreased quantisation parameter after stochastic quantisation.

$$qp_{adj}^s=RTN(qp_{adj}+u) \text{ where } u \leftarrow \mathcal{U}(-0.5,0.5) \quad (13)$$

For example, if in a hardware implementation a bit width can be any integer in the set {4, 5, 6, 7, 8, 10, 12, 16}, if a bit width $b_i$ is increased/decreased to 4.4 then a random value between −0.5 and +0.5 is added to the increased/decreased bit width $b_i$ since the distance between the closest lower and higher integers in the set (4 and 5) is 1; and then the randomised bit width is set to the nearest of those two closest integers (4 and 5). Similarly, if a bit width $b_i$ is increased/decreased to 10.4 a random value between −1 and +1 is added to the increased/decreased bit width $b_i$ since the distance between the closest lower and higher integers in the set (10, 12) is 2; and then the randomised bit width is set to the nearest of those two closest integers (10, 12). In this way the increased/decreased quantisation parameter is rounded up or down to an integer with a probability proportional to the distance to that integer. For example 4.2 would be rounded to 4 with a 20% probability and to 5 with an 80% probability. Similarly 7.9 would be rounded to 7 with 10% probability and to 8 with 90% probability. Testing has shown that in some cases, the quantisation parameters can be identified more efficiently and effectively by adding the random value to the increased/decreased quantisation parameter and then rounding, instead of simply rounding the increased/decreased quantisation parameter.

In other cases, instead of rounding an increased/decreased quantisation parameter to the nearest integer, or nearest integer in a set, the quantisation of the quantisation parameter may be simulated by performing uniform noise quantisation on the increased/decreased quantisation parameter. Performing uniform noise quantisation on the increased/decreased quantisation parameter may comprise adding a random value u between −a and +a to the increased/decreased quantisation parameter where, as described above, a is half the distance between (i) the closest integer in the set to the increased/decreased quantisation parameter that is less that the increased/decreased quantisation parameter and (ii) the closest integer in the set to the increased/decreased quantisation parameter that is greater than the increased/decreased quantisation parameter. When uniform noise quantisation is used to simulate rounding to the nearest integer then a is equal to 0.5, and the uniform noise quantisation may be implemented as shown in equation (14) wherein $qp_{adj}^u$ is the increased/decreased parameter after uniform noise quantisation. By simply adding a random value to the increased/decreased quantisation parameter the increased/decreased quantisation parameter is distorted in a similar manner as rounding the increased/decreased quantisation parameter.

$$qp_{ajd}^u=qp_{adj}+u \text{ where } u \leftarrow \mathcal{U}(-0.5,0.5) \quad (14)$$

In yet other cases, instead of rounding an increased/decreased quantisation parameter to the nearest integer, or nearest integer in a set, the quantisation of the quantisation parameter may be simulated by performing gradient averaging quantisation on the increased/decreased quantisation parameter. Performing gradient averaging quantisation may comprise taking the highest of the allowable integers that is less than or equal to the increased/decreased quantisation parameter and then adding a random value h between 0 and c where c is the distance between (i) the closest integer in the set to the increased/decreased quantisation parameter that is less that the increased/decreased quantisation parameter and (ii) the closest integer in the set to the increased/decreased quantisation parameter that is greater than the increased/decreased quantisation parameter (or by any operation that's mathematically equivalent to the above). When gradient averaging quantisation is used to simulate rounding to the nearest integer then c is equal to 1 and the gradient averaging quantisation may be implemented as shown in equation (15) where RTNI is the round to negative infinity function (which may also be referred to as the floor function) and $qp_{adj}^a$ is the increased/decreased quantisation parameter after gradient averaging quantisation.

$$qp_{adj}^a = RTNI(qp_{adj}) + h \text{ where } h \leftarrow H(0,1) \quad (15)$$

For example, if a bit width $b_i$ can be any integer in the set {4, 5, 6, 7, 8, 10, 12, 16} and a particular bit width $b_i$ is increased/decreased to 4.4 in accordance with the gradient, the highest integer in the set that is less than or equal to the increased/decreased quantisation parameter is chosen (i.e. 4) and a uniform random value between 0 and 1 is added thereto since the distance between the closest lower and higher integers in the set (4 and 5) is 1. Similarly, if a bit width is $b_i$ increased/decreased to 10.4 in accordance with the gradient, the highest integer in the set that is less than or equal to the value is chosen (i.e. 10) and a random value between 0 and 2 is added thereto since the distance between the closest lower and higher integers in the set (10 and 12) is 2.

Testing has shown that the gradient averaging quantisation method works well for problems where the parameters being quantised are largely independent, but less well when optimising highly correlated parameters.

In yet other cases, instead of rounding an increased/decreased quantisation parameter to the nearest integer, or nearest integer in a set, the quantisation of the quantisation parameter may be simulated by performing bimodal quantisation which is a combination of round to the nearest integer quantisation (e.g. equation (12)) and gradient averaging quantisation (e.g. equation (15)). Specifically, in bimodal quantisation gradient averaging quantisation is performed on the increased/decreased quantisation parameter with probability p and rounding quantisation is performed on the increased/decreased quantisation parameter otherwise. When bimodal quantisation is used to simulate rounding to the nearest integer, p is twice the distance to the nearest integer and the bimodal quantisation may be implemented as shown in equation (16) wherein $qp_{adj}^b$ is the increased/decreased quantisation parameter after bimodal quantisation thereof.

$$qp_{adj}^b = \begin{cases} qp_{adj}^r & \text{if } 1 - 2|qp_{adj} - RND(qp_{adj})| > u \text{ where } u \leftarrow \mathcal{U}(0,1) \\ qp_{adj}^a & \text{otherwise} \end{cases} \quad (16)$$

An ordered set of integers in which the difference between consecutive integers in the set is not constant is referred to as a non-uniform set of integers. For example, the ordered set of integers {4, 5, 6, 7, 8, 10, 12, 16} is a non-uniform set of integers as the difference between integers 4 and 5 is one, but the difference between integers 12 and 16 is four. In contrast, an ordered set of integers {1, 2, 3, 4, 5} is a uniform set of integers as the difference between any two consecutive integers is one.

As described above, to simulate the rounding of an increased/decreased quantisation parameter to the nearest integer in a non-uniform set of integers the quantisation parameters (e.g. a or c) may be selected for one of the above quantisation simulation methods (e.g. stochastic quantisation, uniform noise quantisation, gradient average quantisation, or bimodal quantisation) based on the difference between the nearest integer in the set that is lower than the increased/decreased quantisation parameter and the nearest integer in the set that is higher than the increased/decreased quantisation parameter as described above and the increased/decreased quantisation parameter is quantised in accordance with the desired simulation method. In other cases, the rounding of an increased/decreased quantisation parameter to the nearest integer in a non-uniform set of integers may be simulated by: (1) scaling the increased/decreased quantisation parameter based on the distance/difference between the nearest lower integer in the non-uniform set of integers and the nearest higher integer in the non-uniform set of integers (which can be described as the local "density" of the values) to generate a transformed or scaled increased/decreased quantisation parameter; (2) simulating the rounding of the transformed increased/decreased quantisation parameter to the nearest integer using one of the simulation methods described above (e.g. equation (13), (14), (15) or (16)); and (3) reversing the transformation or scaling performed in step (1) to get a final quantised increased/decreased quantisation parameter.

This will be further described by way of example. In this example the non-uniform set of integers is {4, 5, 6, 7, 8, 10, 12, 16}. In step (1) the increased/decreased quantisation parameter is scaled based on the distance/difference between the nearest lower integer in the non-uniform set of integers and the nearest higher value in the non-uniform set of integers. Specifically, the transformed or scaled increased/decreased quantisation parameter is equal to the increased/decreased quantisation parameters divided by the distance between the closest lower integer in the set and the closest higher integer in the set. For example, increased/decreased quantisation parameters between 8 and 12 are scaled (multiplied) by ½ as the distance between the nearest lower integer in the set (i.e. 8 or 10) and the nearest higher integer in the set (i.e. 10 or 12) is 2; increased/decreased quantisation parameters between 12 and 16 are scaled by ¼ as the distance between the nearest lower integer in the set (i.e. 12 or 14) and the nearest higher integer in the set (i.e. 14 or 16) is 4; and increased/decreased quantisation parameters between 4 and 8 are scaled by 1 as the distance between the nearest lower integer in the set (i.e. 4, 5, 6, 7) and the nearest higher integer in the set (i.e. 5, 6, 7, 8) is 1. For example, 13 is transformed to 3.25; 5.4 is transformed to 5.4; 8.9 is transformed to 4.45; and 11.5 is transformed to 5.75. This transformation can be represented by equation (17) where $qp_{adj}$ is the increased/decreased quantisation parameter, $qp_{adj}^t$ is the transformed increased/decreased quantisation parameter and s is as shown in equation (18) where $I_{qp_{adj}>8}$ is 1 when $qp_{adj}>8$ and 0 otherwise and $I_{qp_{adj}>82}$ is 1 when $qp_{adj}>12$ and 0 otherwise such that s=1 for $qp_{adj}\le 8$, s=2 for $8<qp_{adj}\le 12$ and s=4 for $qp_{adj}>12$.

$$qp_{adj}^t = \frac{qp_{adj}}{s} \quad (17)$$

$$s = \left(1 + I_{qp_{adj}>8}\right)\left(1 + I_{qp_{adj}>12}\right) \quad (18)$$

In step (2) the rounding of the transformed value to the nearest integer is simulated using one of the methods for simulating rounding to the nearest integer described above (e.g. equation (13), (14), (15) or (16)). In step (3) the transformation performed in step (1) is reversed to generate a final quantised value. This is represented by equation (19) where $qp_{adj}^{t-q}$ is the quantised transformed value generated in step (2) and $qp_{adj}^q$ is the final quantised increased/decreased quantisation parameter.

$$qp_{adj}^q = qp_{adj}^{t-s} * s \quad (19)$$

For example, if the output of step (2) is 3 and s=4 then this is transformed back to 12; if the output of step (2) is 5 and s=1 then this is transformed back to 5; if the output of step (2) is 4 and s=2 then this is transformed back to 8; and if the output of step (2) is 6 and s=2 then this is transformed back to 12. This is summarized in Table 2.

TABLE 2

| | | | | |
|---|---|---|---|---|
| $qp_{adj}$ | 13 | 5.4 | 8.9 | 11.5 |
| s | 4 | 1 | 2 | 2 |
| $qp_{adj}^t$ | 3.25 | 5.4 | 4.45 | 5.75 |
| $qp_{adj}^{t-q}$ | 3 | 5 | 4 | 6 |
| $qp_{adj}^q$ | 12 | 5 | 8 | 12 |

It will be evident to a person of skill in the art that these are examples of functions that can be used to quantise the quantisation parameters, or simulate the quantisation thereof, and that other functions may be used to quantise the quantisation parameters, or simulate the quantisation thereof. However, to be able to back-propagate the derivative of the cost metric cm to the quantisation parameters the quantisation function q (e.g. $qP_{adj}^r$, $qp_{adj}^s$, $qp_{adj}^u$, $qp_{adj}^g$, $qp_{adj}^b$) is defined so that the derivative of the cost metric can be defined in terms of the quantisation parameters. The inventors have identified that a machine learning framework may generate a useful gradient of the cost function with respect to the quantisation parameters if the derivative of the quantisation function q (e.g. $qp_{adj}^r$, $qp_{adj}^s$, $qp_{adj}^u$, $qp_{adj}^g$, $qp_{adj}^b$) with respect to the quantisation parameter being quantised is defined as one.

In some cases, the quantisation (e.g. rounding) of the increased/decreased quantisation parameters may be performed by the relevant quantisation block. For example, in some cases (as described in more detail below) the increased/decreased quantisation parameters may be provided to the quantisation blocks and each quantisation block may be configured to quantise (e.g. round) its quantisation parameters, or simulate the quantisation (e.g. rounding) thereof, before using the quantisation parameters to quantise the input values.

In cases where adjusting a quantisation parameter comprises quantising (e.g. rounding) the increased/decreased quantisation parameter (in accordance with the gradient) or simulating the quantisation thereof, by any of the methods described above, a higher precision (e.g. floating point) version of the quantisation parameter may be maintained and in subsequent iterations of block 508 it is the higher precision version of the quantisation parameter that is increased/decreased in accordance with the gradient. In some cases, a stochastically quantised version of the increase/decreased quantisation parameter may be maintained, and it is the stochastically quantised version of the quantisation parameter that is increased/decreased in a subsequent iteration.

Once one or more of the quantisation parameters have been adjusted based on the gradients the method 500 may end or the method 500 may proceed to block 510 where the blocks 502-508 may be repeated.

At block 510, a determination is made as to whether the blocks 502-508 (i.e. determining an output of the quantising model of the DNN in response to training data, determining a cost metric based on the output and the size of the DNN; back-propagating the derivative of the cost metric to the quantisation parameters to generate gradients of the cost metric with respect to the quantisation parameters, and adjusting the quantisation parameters based on the gradients) are to be repeated. In some cases, the determination as to whether blocks 502-508 are to be repeated is based on whether a predetermined number of iterations of blocks 502-508 have been completed or a predetermined amount of training time has elapsed. The predetermined number of iterations or the predetermined amount of training may have been determined empirically as being sufficient to produce good results. In other cases, the determination as to whether blocks 502-508 are to be repeated may be based on whether the cost metric has converged. Any suitable criteria may be used to determine when the cost metric has converged. For example, in some cases it may be determined that the cost metric has converged if it hasn't changed significantly (e.g. more than a predetermined threshold) over a predetermined number of iterations.

If it is determined that blocks 502-508 are not to be repeated, then the method 500 may end or the method 500 may proceed to block 512. If, however, it is determined that blocks 502-508 are to be repeated then the method 500 proceeds back to block 502 where blocks 502-508 are repeated with the quantisation parameters as adjusted in block 508. For example, if in the first iteration a set of values is quantised by a quantisation block to a fixed point number formation defined by a mantissa bit width of 6 and an exponent of 4 and the mantissa bit width is adjusted to a bit width of 5 and the exponent is not adjusted then in the next iteration that set of values will be quantised by the quantisation block to a fixed point number format defined by a bit width of 5 and an exponent of 4.

At block 512, the quantisation parameters (as adjusted in block 508) are output for use in configuring hardware logic to implement the DNN. In some cases, it is the floating point versions of the quantisation parameters that are output. In other cases, it is the versions of the quantisation parameters that can be used by hardware logic that are output (i.e. the floating point versions of the quantisation parameters after they have been quantised to integers or to a set of integers). The quantisation parameters may be output in any suitable manner. Once the quantisation parameters (as adjusted in block 508) have been output the method 500 may end or the method 500 may proceed to block 514.

At block 514, hardware logic capable of implementing a DNN is configured to implement the DNN using the quantisation parameters output in block 512. Where the quantisation parameters output in block 512 were in a floating point number format the quantisation parameters may be quantised to integers, or a set of integers, before they are used to configure hardware logic to implement the DNN. Configuring hardware logic to implement a DNN may generally comprise configuring the hardware logic to process inputs to each layer of the DNN in accordance with that layer and provide the output of that layer to a subsequent layer or provide the output as the output of the DNN. For example, if a DNN comprises a first convolution layer and a second normalisation layer, configuring hardware logic to implement such a DNN comprises configured the hardware logic to receive inputs to the DNN and process the inputs in accordance with the weights of the convolution layer, process the outputs of the convolution layer in accordance with the normalisation layer, and then output the outputs of the normalisation layer as the outputs of the DNN. Configuring a hardware logic to implement a DNN using the quantisation parameters output in block 512 may comprise configuring the hardware logic to receive and process inputs to each layer in accordance with the quantisation parameters for that layer (i.e. in accordance with the fixed point number formats defined by the quantisation parameters). For example, if the quantisation parameters indicated that a fixed point number format defined by an exponent of 4 and a bit-width of 6 is to be used for the input data values of a layer of the DNN then the hardware logic to implement the DNN may be configured to interpret the input data values of that layer on the basis that they are in a fixed point number format defined by an exponent of 4 and a bit width of 6.

In the method 500 of FIG. 5 the complete cost metric is calculated (e.g. in accordance with equation (2)) and the derivative of the cost metric is back-propagated to the quantisation parameters to calculate a gradient for each quantisation parameter. The gradient for a particular quantisation parameter is then used to adjust the quantisation parameter. However, in other examples calculating the cost metric may comprise calculating the error metric and size metric and determining a separate gradient for each metric for each quantisation parameter. In other words, a gradient of the error metric with respect to each quantisation parameter is generated and a gradient of the size metric with respect to each quantisation parameter is generated. The gradient of the error metric with respect to a quantisation parameter may be generated by backpropagating the derivative of the error metric to the quantisation parameter in the same manner as the derivative of the cost metric is back-propagated to a quantisation parameter. The gradient of the size metric with respect to quantisation parameter may be generated by back-propagation or may be generated directly from the size metric. A final gradient for each quantisation parameter may be generated from the two gradients in the same manner that the corresponding cost metrics are combined to form the cost metric. For example, a final gradient may be generated as the weighted sum of the two gradients. By varying the weights associated with the two gradients a balance can be found between size and error. The quantisation parameters may then be adjusted in accordance with the final gradients in the same manner as described above.

Identification of Quantisation Parameters and Weights

Although the method 500 of FIG. 5 has been described as being used to identify the quantisation parameters of the DNN, in other examples the weights of the DNN may be identified concurrently with the quantisation parameters. In these cases, the derivative for the cost metric may also be back-propagated to the weights to generate gradients of the cost metric with respect to the weights, and the weights may be adjusted in a similar manner as the quantisation parameters based on the corresponding gradients.

Figure 10:
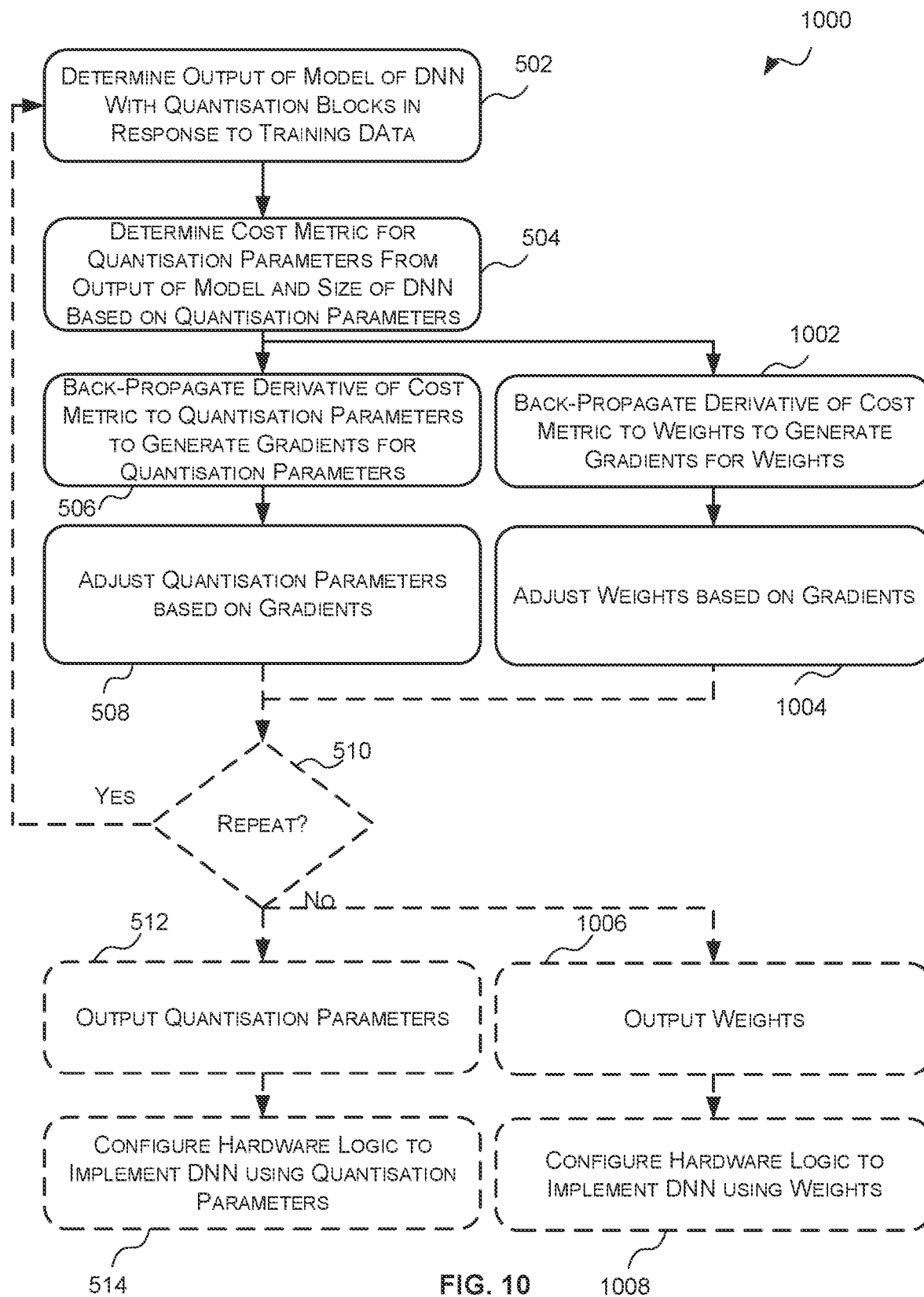
FIG. 10 is a flow diagram of an example method for identifying quantisation parameters and weights of a DNN.

Reference is now made to FIG. 10 which illustrates a method 1000 of identifying the quantisation parameters and weights of a DNN. The method 1000 may be used to re-train the network to take into account the quantisation of the values of the DNN (i.e. to update the weights after an initial training session, such as, an initial training session performed on a floating point model of the DNN) or may be used to perform an initial training of the network (i.e. train the network from an untrained set of weights). The method 1000 includes blocks 502 to 512 of the method 500 of FIG. 5, but also comprises blocks 1002 and 1004 (and optionally blocks 1006 and 1008). Blocks 502 to 512 operate in the same manner as described above. When the method 1000 is used to re-train the DNN the initial set of weights used in the quantising model of the DNN may be a trained set of weights. However, where the method 1000 is used to train the DNN, the initial set of weights used in the model of the DNN may be a random set of weights or another set of weights designed for training a DNN.

At block 1002, after the output of the quantising model of the DNN in response to training data has been determined (block 502) and a cost metric has been determined from the output of the quantising model of the DNN and the quantisation parameters (block 504), the derivative of the cost metric is back-propagated to one or more weights so as to generate gradients of the cost metric with respect to each of those weights. The gradient of the cost metric with respect to a weight is referred to herein as the gradient for the weight. As with the gradients for the quantisation parameters a positive gradient for a weight indicates that the cost metric can be decreased by decreasing that weight, and a negative gradient for a weight indicates that the cost metric may be decreased by increasing that weight. Once the gradients for the one or more weights have been generated the method proceeds to block 1004.

At block 1004, one or more of the weights are adjusted based on the gradients for the weights. The weights may be adjusted in a similar manner to the quantisation parameters. For example, as described above, the sign of the gradient for a weight indicates whether the cost metric will be decreased by increasing or decreasing the weight. Specifically, if the gradient for a weight is positive a decrease in the weight will decrease the cost metric; and if the gradient for a weight is negative an increase in the quantisation parameter will decrease the cost metric. Accordingly, adjusting a weight may comprise increasing or decreasing the weight in accordance with the sign of the gradient so as to increase or decrease the cost metric (depending on whether it is desirable to increase or decrease the cost metric). For example, if a lower cost metric is desirable and the gradient for the weight is negative then the weight may be increased in an effort to decrease the cost metric. Similarly, if a lower cost metric is desirable and the gradient for the weight is positive then the weight may be decreased in an effort to decrease the cost metric.

In some cases, the amount by which the weight is increased or decreased may be based on the magnitude of the gradient for that weight. In particular, in some cases, a weight may be increased or decreased by the magnitude of the gradient for that weight. For example, if the magnitude of the gradient is 0.6 then the weight may be increased or decreased by 0.6. In other cases, the weight may be increased or decreased by a factor of the magnitude of the gradient for that weight. In particular, in some cases, weights may converge faster by adjusting the weights by what is referred to as a learning rate.

Once the weights have been adjusted based on the corresponding gradients the method 1000 may end or the method 1000 may proceed to block 510 where blocks 502-508 and 1002-1004 may be repeated. Similar to blocks 512 and 514, the method 1000 may also comprise outputting the adjusted weights (at 1006) and/or configuring hardware to implement the DNN using the adjusted weights (at 1008).

Although in the method 1000 of FIG. 10 the weights and the quantisation parameters are adjusted each iteration, in other examples in each iteration one or both of the weights and the quantisation parameters may be selected for adjustment. For example, the quantisation parameters may be adjusted for a predetermined number of iterations and then the weights may be adjusted for a predetermined number of iterations. In other cases the weights and the quantisation parameters may be adjusted in alternate iterations. For example, weight adjustment may be performed in odd numbered iterations and quantisation parameter adjustments may be performed in even numbered iterations. This would allow the weights to be adjusted while the quantisation parameters are rounded (or the rounding thereof is simulated) and the quantisation parameters to be adjusted while the weights are rounded.

Quantisation Blocks

Example implementations of the quantisation blocks of a quantising model of a DNN will now be described. As described above, each quantisation block is configured to quantise a set of values input to a layer of a DNN to a fixed point number format defined by one or more quantisation parameters. In these examples, each fixed point number format is defined by a mantissa bit length b and an exponent exp where the exponent exp is an integer that is shared by a set of values that are represented in the fixed point number format such that the size of the set of input data values in the fixed point number format is based on the mantissa bit length b.

To be able to back-propagate the derivative of the cost metric to the quantisation parameters, not only is the quantisation function performed by each quantisation blocks defined, but the derivative thereof is defined. In practice an equation's derivate is automatically defined by a machine learning framework, such as, but not limited to, TensorFlow™.

Figure 11:
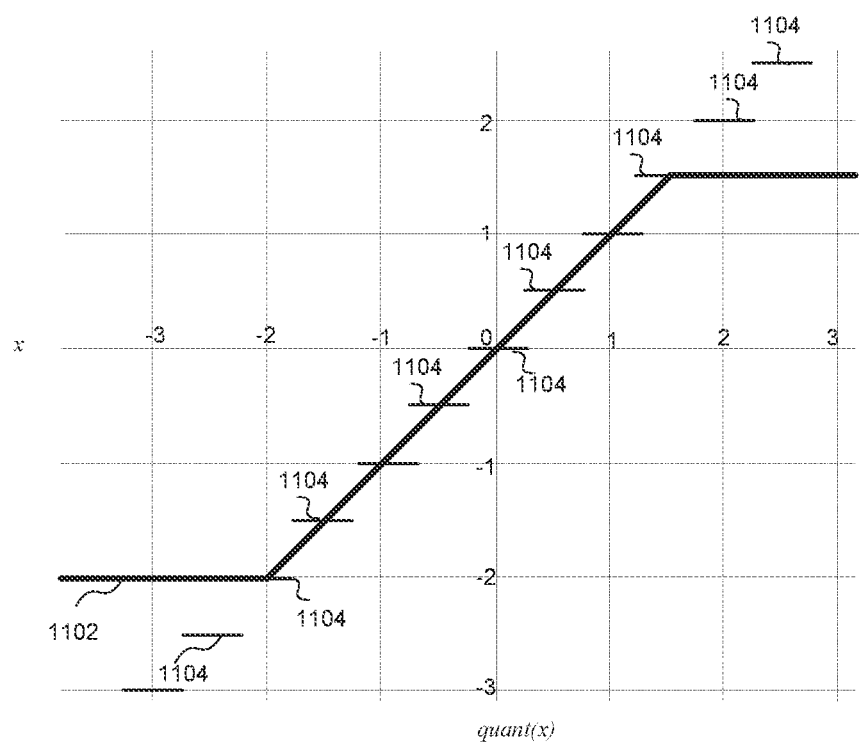
FIG. 11 is a schematic diagram illustrating quantisation to an example fixed point number format.

The process of quantising a value x to a fixed point number format can be described as comprising two steps—(i) thresholding the value x to the range of numbers representable by the fixed point number format (e.g. line 1102 of FIG. 11 for an exponent of −1 and bit width of 3); and (ii) selecting a representable number in the fixed point number format to represent the value x by rounding the thresholded value x to the nearest $exp^{th}$ power of 2 (e.g. lines 1104 of FIG. 11 for an exponent of −1 and a bit width of 3).

The thresholding step of the quantisation operation of a value x to a fixed point number format defined by a mantissa bit length b and an exponent exp—i.e. thresholding the value x to the range representable by the fixed point number format—may be implemented by equation (20) wherein clamp(x, low, high) is as defined in equation (21) and low is the minimum or lowest representable number in the fixed point number format defined by b and exp (e.g. low=$-2^{b-exp-1}$) and high is the maximum or highest representable number in the fixed point number format defined by b an exp (e.g. high=$2^{b+exp-1}-2^{exp}$):

$$\text{thresh}(x,b,\text{exp})=\text{clamp}(x,-2^{exp+b-1},2^{exp+b-1}-2^{exp}) \quad (20)$$

$$\text{clamp}(x,\text{low},\text{high})=\min(\max(x,\text{low}),\text{high}) \quad (21)$$

To be able to perform back-propagation through the thresholding operation a derivative of the thresholding operation is defined. The derivative of the thresholding function defined in equation (20) with respect to x is 1 for values that fall within the representable range and 0 otherwise. However, in some cases a more useful derivative is one that is 1 for all values that fall within the quantisation bins and 0 otherwise. This can be achieved by using the thresholding function set out in equation (22) instead of the thresholding function set out in equation (20):

$$\text{thresh}(x,b,\text{exp})=\text{clamp}(x,-2^{exp+b-1}-2^{exp-1},2^{exp+b-1}-2^{exp-1}) \quad (22)$$

The rounding step of the quantisation operation—i.e. rounding a value to the nearest $exp^{th}$ power of 2—can be implemented by equation (23) where $\lfloor \ \rfloor$ is the RTNI (round towards negative infinity) function (also known as the floor function).

$$\text{round}(x,\text{exp})=2^{exp}\left\lfloor 2^{-exp}x+\frac{-1^{sign(x)}}{2}\right\rfloor \quad (23)$$

The derivative of the rounding function defined in equation (23) with respect to x may not be useful in identifying DNN parameters (e.g. weights and/or quantisation parameters) as it is zero almost everywhere, so the derivative may be set to 1.

Thus the total quantisation quant (x, b, exp) of a value x to a fixed point number format defined by a bit width b and an exponent exp can be implemented using a combination of the thresholding equation (either equation (20) or equation (22)) and rounding equation (23) as shown in equation (24):

$$\text{quant}(x,b,\text{exp})=\text{round}(\text{thresh}(x,b,\text{exp}),\text{exp}) \quad (24)$$

Where the quantisation block is configured to receive the increased/decreased quantisation parameters and quantise (e.g. round) the received quantisation parameters before using the quantisation parameters to quantise an input value, the combined formula can be written as shown in equation (25) wherein q is the rounding function or quantisation function used to quantise the quantisation parameters or simulate the quantisation thereof. Example rounding functions for quantising the quantisation parameters or for simulating the quantisation thereof were described above in relation to block 508. In other words, the quantisation function q may implement (i) the rounding method described above to round to the nearest integer or nearest integer in a set, or (ii) any of the methods described above that simulate rounding to the nearest integer or integer in a set (e.g. one of the stochastic quantisation method, uniform quantisation method, gradient averaging quantisation method or the bimodal quantisation method). As described above, to be able to back propagate the derivative of the cost metric cm to the quantisation parameters the quantisation function q is defined so that the derivative of the cost metric can be defined in terms of the quantisation parameters.

$$\text{quant}(x,b,\text{exp})=2^{q(exp)}\text{round}(\text{thresh}(2^{-q(exp)}x,-2^{q(b-1)},2^{q(b-1)}-1)) \quad (25)$$

The inventors have identified that a machine learning framework may generate useful gradients of the cost function with respect to the quantisation parameters (e.g. gradients which can be used to adjust the quantisation parameters) if the derivative of the quantisation function q with respect to the quantisation parameter it is quantising is defined as one. For example, testing has shown that if the derivative of the quantisation function q with respect to the quantisation parameter it is quantising is set to one, then a machine learning framework may generate: (i) the derivative $d_b(x)$ of the main quantisation function quant with respect to the quantisation parameter b as shown in equation (26) where low is the minimum or lowest representable number in the fixed point number format defined by b and exp, and high is the maximum or highest representable number in the fixed point number format defined by b and exp; and (ii) the derivative $d_{exp}(x)$ of the main quantisation function quant with respect to the quantisation parameter exp as shown in equation (27).

$$d_b(x) = \begin{cases} x < \text{low}, & \log(2)(\text{low}) \\ x > \text{high}, & \log(2)(-\text{low}) \\ \text{otherwise}, & 0 \end{cases} \quad (26)$$

-continued $$d_{exp}(x) = \begin{cases} x < \text{low}, & 2^{exp}\log(2) \text{ round } (-2^{b-1}) \\ x > \text{high}, & 2^{exp}\log(2) \text{ round } (2^{b-1}-1) \\ \text{otherwise}, & \log(2)(2^{exp} \text{ round } (2^{-exp}x)-x) \end{cases} \quad (27)$$

It can be seen that the machine learning framework may calculate a derivative of the cost function for each quantisation parameter (e.g. b, exp) of a quantisation block for each input value quantised by that quantisation block. The machine learning framework may then calculate a final derivative of the cost function for each quantisation parameter (e.g. b, exp) based on the individual derivates for each quantisation parameter. For example, in some cases the machine learning framework may calculate a final derivative of the cost function for each quantisation parameter of a quantisation block by adding or summing the individual derivatives for that quantisation parameter.

Where a variable bit length variant of the Q8A fixed point number format is used to represent the input values to the layers of a DNN and the zero point z is 0 the quantisation function performed by a quantisation block may be represented by equation (28) where b, exp, and α are the trainable quantisation parameters:

$$\text{quant}(x,b,\exp,\alpha)=2^{exp}\text{round}(\text{thresh}(2^{-exp}x,(\alpha-1)2^{q(b-1)},(\alpha+1)2^{q(b-1)}-1)) \quad (28)$$

The main differences between equation (28) and equation (25) are the introduction of α which is a scaling factor, and the fact that exp is not quantised. The quantisation parameters of the variable bit length variant of the Q8A format, as shown in equation (1), can be generated from the trained quantisation parameters exp, b and α as shown in equations (24), (25) and (26):

$$r_{min}=2^{exp}\text{RND}(2^{RND(b)-1}(\alpha-1)) \quad (29)$$

$$r_{max}=2^{exp}\text{RND}(2^{RND(b)-1}(\alpha+1)-1) \quad (30)$$

$$z=0 \quad (31)$$

Where a variable bit length variant of the Q8A fixed point number format is used to represent the input values to the layers of a DNN where the zero point z may not be zero the quantisation function performed by a quantisation block may be represented by equation (32).

$$\text{quant}(x,b,\exp,\alpha)=2^{exp}(\text{round}(\text{thresh}(2^{-exp}x-2^{q(b-1)}\alpha,-2^{q(b-1)},(\alpha+1)2^{q(b-1)}-1))+2^{q(b-1)}\alpha) \quad (32)$$

With respect to equations (28) and (32), while the quantisation parameters of the bit length variant of the Q8A fixed point number format are $r_{min}$, $r_{max}$, z and b, testing has shown that training b, exp and α and calculating $r_{min}$, $r_{max}$ and z therefrom has shown to train better.

In some cases, instead of the quantisation blocks quantising the values input thereto to an output fixed point number format defined by one or more quantisation parameters (e.g. in accordance with equation (24), (25), (28) or (32)), the quantisation blocks may be configured to merely simulate the transformation that the quantisation of an input value represents.

For example, in some cases, instead of a quantisation block being configured to threshold a weight or an input value/activation to the representable range of the fixed point number format and then round the thresholded weight/activation to the nearest representable number in the fixed point number format, the quantisation may be simulated by thresholding the weighs/activations, and adding a random value u between −a and +a to the thresholded weight/activation and then rounding, where a is half the distance between representable numbers of the fixed point number format $$\left(\text{i.e. } \frac{2^{exp}}{2}\right).$$

For example, if a fixed point number format has an exponent exp of 0, then before rounding the weight/activation, a random value between −0.5 and +0.5 is added to the thresholded weight/activation since the distance between representable numbers is 1. Similarly, if a fixed point number format has an exponent of 1, a random value between −1 and +1 is added to the thresholded weight/activation since the distance between representable numbers is 2. In this way the thresholded weight/activation is rounded up or down to a representable number with a probability proportional to the distance to that representable number. For example, where the exponent exp is 0, a thresholded weight/activation of 4.2 would be rounded to 4 with an 80% probability and to 5 with a 20% probability. Similarly 7.9 would be rounded to 7 with 10% probability and to 8 with 90% probability. In other examples, the ordering of the randomisation and thresholding may be reversed. For example, instead of thresholding a weight/activation, adding a random value to the threshold weight/activation and then rounding, a random value may be added to the weight/activation to generate a randomized weight, the randomized weight/activation may be thresholded then rounded.

In other cases, instead of a quantisation block being configured to round a thresholded weight/activation to the nearest representable number, a quantisation block may be configured to simulate the quantisation of the weights/activations by adding a random value u between −a and +a to the thresholded weight/activation where, as described above, a is half the distance between representable numbers in the fixed point number format. By simply adding such a random value to the thresholded weight/activation the thresholded weight/activation is distorted in a similar manner as rounding the thresholded weight/activation. In other examples, the ordering of the randomisation and thresholding may be reversed. For example, instead of thresholding a weight/activation, and adding a random value to the threshold weight, a random value may be added to the weight/activation to generate a randomized weight/activation and the randomized weight/activation may be thresholded.

In yet other cases, instead of a quantisation block rounding a thresholded weight/activation to the nearest representable number, the quantisation block may be configured to simulate the quantisation by performing gradient averaging quantisation on the thresholded weight/activation. Performing gradient averaging quantisation on the thresholded weight/activation may comprise taking the floor of the thresholded weight/activation and then adding a random value h between 0 and c where c is the distance between representable numbers in the fixed point number format. For example, if the exponent exp of the fixed point number format is 0 then after taking the floor of the thresholded weight/activation a random value between 0 and 1 is added thereto since the distance between representable numbers in the fixed point number format is 1. Similarly, if the exponent exp of the fixed point number is 1 then after taking the floor of the thresholded weight/activation a random value between 0 and 2 is added thereto since the distance between representable numbers is 2.

In yet other cases, instead of a quantisation block rounding a thresholded weight/activation to the nearest representable number, the quantisation block may be configured to simulate the quantisation by performing bimodal quantisation on the thresholded weight/activation which, as described above, is a combination of round to nearest quantisation and gradient averaging quantisation. Specifically, in bimodal quantisation, gradient averaging quantisation is performed on the thresholded weight/activation with probability p and rounding quantisation is performed on the thresholded weight/activation otherwise, where p is twice the distance to the nearest representable value divided by the distance between representable numbers in the fixed point number format. In other examples, the ordering of the bimodal quantisation and thresholding may be reversed. For example, instead of thresholding a weight/activation, and performing bimodal quantisation on the thresholded weight/activation, bimodal quantisation may be performed on the weight/activation and thresholding may be performed on the result of the bimodal quantisation.

In other words, the rounding function (round) in any of equations (24), (25), (28) and (32) may be replaced with a function that implements any the simulated rounding methods described above (e.g. the stochastic quantisation method, uniform noise quantisation method, the gradient averaging quantisation method or the bimodal quantisation method).

Test Results

Reference is now made to Tables 3 to 5 which illustrate the quantisation parameters (bit width and exponent) selected for the layers of an SSD_Mobilenet_V1_object detection CNN trained on the COCO dataset using the method 500 of FIG. 5. Table 3 shows the quantisation parameters (bit widths and exponents) selected for the input values (also called activations in some contexts) and weights (also called coefficients in some contexts) of the layers of the CNN where the bit widths were limited to the set {5, 6, 7, 8, 10, 12, 16}. Table 4 shows the quantisation parameters (bit widths and exponents) where the bit widths were limited to the set {5, 6, 7, 8, 10}. Table 5 shows the quantisation parameters (bit widths and exponents) where the bit widths were set to 8 bits (i.e. only the exponents were selected). The Mean Average Precision of a floating point version of the CNN was 0.207. The Mean Average Precision of the CNN when the quantisation parameters of Table 3 were used to implement the CNN was 0.208. The Mean Average Precision of the CNN when the quantisation parameters of Table 4 were used to implement the CNN was 0.205. The Mean Average Precision of the CNN when the quantisation parameters of Table 5 were used to implement the CNN was 0.168. Therefore it can be seen that the method 500 of FIG. 5 can be used to find a good balance between network size and accuracy.

TABLE 3

| Layer | Input Bit | Input Exp | Wgt Bit | Wgt Exp |
|---|---|---|---|---|
| BoxPredictor_0/BoxEncodingPredictor/Conv2D | 16 | −8 | 12 | −11 |
| BoxPredictor_0/ClassPredictor/Conv2D | 16 | −8 | 16 | −11 |
| BoxPredictor_1/BoxEncodingPredictor/Conv2D | 12 | −8 | 16 | −12 |
| BoxPredictor_1/ClassPredictor/Conv2D | 12 | −8 | 16 | −11 |
| BoxPredictor_2/BoxEncodingPredictor/Conv2D | 12 | −7 | 12 | −12 |
| BoxPredictor_2/ClassPredictor/Conv2D | 12 | −7 | 12 | −11 |
| BoxPredictor_3/BoxEncodingPredictor/Conv2D | 10 | −6 | 12 | −12 |
| BoxPredictor_3/ClassPredictor/Conv2D | 10 | −6 | 12 | −11 |
| BoxPredictor_4/BoxEncodingPredictor/Conv2D | 10 | −5 | 12 | −11 |
| BoxPredictor_4/ClassPredictor/Conv2D | 10 | −5 | 12 | −11 |
| BoxPredictor_5/BoxEncodingPredictor/Conv2D | 10 | −4 | 12 | −12 |
| BoxPredictor_5/ClassPredictor/Conv2D | 10 | −4 | 12 | −11 |
| FeatureExtractor/MobilenetV1/Conv2d_13_pointwise_1_Conv2d_2_1 × 1_256/Conv2D_Fold | 12 | −8 | 16 | −12 |
| FeatureExtractor/MobilenetV1/Conv2d_13_pointwise_1_Conv2d_3_1 × 1_128/Conv2D_Fold | 12 | −7 | 12 | −12 |
| FeatureExtractor/MobilenetV1/Conv2d_13_pointwise_1_Conv2d_4_1 × 1_128/Conv2D_Fold | 10 | −6 | 12 | −11 |
| FeatureExtractor/MobilenetV1/Conv2d_13_pointwise_1_Conv2d_5_1 × 1_64/Conv2D_Fold | 10 | −5 | 12 | −11 |
| FeatureExtractor/MobilenetV1/Conv2d_13_pointwise_2_Conv2d_2_3 × 3_s2_512/Conv2D_Fold | 12 | −8 | 12 | −9 |
| FeatureExtractor/MobilenetV1/Conv2d_13_pointwise_2_Conv2d_3_3 × 3_s2_256/Conv2D_Fold | 12 | −7 | 12 | −9 |
| FeatureExtractor/MobilenetV1/Conv2d_13_pointwise_2_Conv2d_4_3 × 3_s2_256/Conv2D_Fold | 12 | −6 | 12 | −9 |
| FeatureExtractor/MobilenetV1/Conv2d_13_pointwise_2_Conv2d_5_3 × 3_s2_128/Conv2D_Fold | 10 | −5 | 12 | −8 |
| FeatureExtractor/MobilenetV1/MobilenetV1/Conv2d_0/Conv2D_Fold | 16 | −9 | 12 | −9 |
| FeatureExtractor/MobilenetV1/MobilenetV1/Conv2d_10_depthwise/depthwise_Fold | 12 | −6 | 16 | −11 |
| FeatureExtractor/MobilenetV1/MobilenetV1/Conv2d_10_pointwise/Conv2D_Fold | 16 | −8 | 16 | −14 |
| FeatureExtractor/MobilenetV1/MobilenetV1/Conv2d_11_depthwise/depthwise_Fold | 12 | −7 | 12 | −7 |
| FeatureExtractor/MobilenetV1/MobilenetV1/Conv2d_11_pointwise/Conv2D_Fold | 16 | −7 | 16 | −13 |
| FeatureExtractor/MobilenetV1/MobilenetV1/Conv2d_12_depthwise/depthwise_Fold | 16 | −8 | 16 | −7 |
| FeatureExtractor/MobilenetV1/MobilenetV1/Conv2d_12_pointwise/Conv2D_Fold | 12 | −7 | 16 | −11 |
| FeatureExtractor/MobilenetV1/MobilenetV1/Conv2d_13_depthwise/depthwise_Fold | 16 | −7 | 16 | −8 |
| FeatureExtractor/MobilenetV1/MobilenetV1/Conv2d_13_pointwise/Conv2D_Fold | 12 | −7 | 16 | −13 |
| FeatureExtractor/MobilenetV1/MobilenetV1/Conv2d_1_depthwise/depthwise_Fold | 16 | −9 | 16 | −9 |
| FeatureExtractor/MobilenetV1/MobilenetV1/Conv2d_1_pointwise/Conv2D_Fold | 12 | −6 | 16 | −12 |
| FeatureExtractor/MobilenetV1/MobilenetV1/Conv2d_2_depthwise/depthwise_Fold | 12 | −8 | 16 | −10 |
| FeatureExtractor/MobilenetV1/MobilenetV1/Conv2d_2_pointwise/Conv2D_Fold | 12 | −8 | 16 | −11 |
| FeatureExtractor/MobilenetV1/MobilenetV1/Conv2d_3_depthwise/depthwise_Fold | 16 | −8 | 16 | −9 |
| FeatureExtractor/MobilenetV1/MobilenetV1/Conv2d_3_pointwise/Conv2D_Fold | 12 | −6 | 16 | −12 |
| FeatureExtractor/MobilenetV1/MobilenetV1/Conv2d_4_depthwise/depthwise_Fold | 12 | −7 | 12 | −10 |
| FeatureExtractor/MobilenetV1/MobilenetV1/Conv2d_4_pointwise/Conv2D_Fold | 12 | −8 | 16 | −11 |
| FeatureExtractor/MobilenetV1/MobilenetV1/Conv2d_5_depthwise/depthwise_Fold | 12 | −6 | 16 | −10 |
| FeatureExtractor/MobilenetV1/MobilenetV1/Conv2d_5_pointwise/Conv2D_Fold | 16 | −8 | 16 | −10 |
| FeatureExtractor/MobilenetV1/MobilenetV1/Conv2d_6_depthwise/depthwise_Fold | 12 | −8 | 16 | −11 |
| FeatureExtractor/MobilenetV1/MobilenetV1/Conv2d_6_pointwise/Conv2D_Fold | 12 | −7 | 16 | −11 |
| FeatureExtractor/MobilenetV1/MobilenetV1/Conv2d_7_depthwise/depthwise_Fold | 12 | −8 | 16 | −9 |
| FeatureExtractor/MobilenetV1/MobilenetV1/Conv2d_7_pointwise/Conv2D_Fold | 12 | −8 | 16 | −12 |

TABLE 3-continued

| Layer | Input Bit | Input Exp | Wgt Bit | Wgt Exp |
|---|---|---|---|---|
| FeatureExtractor/MobilenetV1/MobilenetV1/Conv2d_8_depthwise/depthwise_Fold | 16 | −8 | 16 | −11 |
| FeatureExtractor/MobilenetV1/MobilenetV1/Conv2d_8_pointwise/Conv2D_Fold | 16 | −8 | 16 | −12 |
| FeatureExtractor/MobilenetV1/MobilenetV1/Conv2d_9_depthwise/depthwise_Fold | 12 | −7 | 12 | −9 |
| FeatureExtractor/MobilenetV1/MobilenetV1/Conv2d_9_pointwise/Conv2D_Fold | 12 | −6 | 16 | −13 |

TABLE 4

| Layer | Input Bit | Input Exp | Wgt Bit | Wgt Exp |
|---|---|---|---|---|
| BoxPredictor_0/BoxEncodingPredictor/Conv2D | 10 | −5 | 10 | −8 |
| BoxPredictor_0/ClassPredictor/Conv2D | 10 | −5 | 10 | −8 |
| BoxPredictor_1/BoxEncodingPredictor/Conv2D | 8 | −4 | 10 | −9 |
| BoxPredictor_1/ClassPredictor/Conv2D | 8 | −4 | 10 | −8 |
| BoxPredictor_2/BoxEncodingPredictor/Conv2D | 8 | −4 | 10 | −9 |
| BoxPredictor_2/ClassPredictor/Conv2D | 8 | −4 | 8 | −8 |
| BoxPredictor_3/BoxEncodingPredictor/Conv2D | 8 | −4 | 10 | −8 |
| BoxPredictor_3/ClassPredictor/Conv2D | 8 | −4 | 8 | −8 |
| BoxPredictor_4/BoxEncodingPredictor/Conv2D | 8 | −4 | 8 | −8 |
| BoxPredictor_4/ClassPredictor/Conv2D | 8 | −4 | 8 | −8 |
| BoxPredictor_5/BoxEncodingPredictor/Conv2D | 8 | −4 | 8 | −9 |
| BoxPredictor_5/ClassPredictor/Conv2D | 8 | −4 | 10 | −7 |
| FeatureExtractor/MobilenetV1/Conv2d_13_pointwise_1_Conv2d_2_1 × 1_256/Conv2D_Fold | 8 | −4 | 10 | −9 |
| FeatureExtractor/MobilenetV1/Conv2d_13_pointwise_1_Conv2d_3_1 × 1_128/Conv2D_Fold | 8 | −4 | 10 | −9 |
| FeatureExtractor/MobilenetV1/Conv2d_13_pointwise_1_Conv2d_4_1 × 1_128/Conv2D_Fold | 8 | −4 | 8 | −8 |
| FeatureExtractor/MobilenetV1/Conv2d_13_pointwise_1_Conv2d_5_1 × 1_64/Conv2D_Fold | 8 | −4 | 8 | −8 |
| FeatureExtractor/MobilenetV1/Conv2d_13_pointwise_2_Conv2d_2_3 × 3_s2_512/Conv2D_Fold | 10 | −4 | 10 | −7 |
| FeatureExtractor/MobilenetV1/Conv2d_13_pointwise_2_Conv2d_3_3 × 3_s2_256/Conv2D_Fold | 8 | −4 | 8 | −6 |
| FeatureExtractor/MobilenetV1/Conv2d_13_pointwise_2_Conv2d_4_3 × 3_s2_256/Conv2D_Fold | 8 | −3 | 8 | −6 |
| FeatureExtractor/MobilenetV1/Conv2d_13_pointwise_2_Conv2d_5_3 × 3_s2_128/Conv2D_Fold | 8 | −4 | 8 | −6 |
| FeatureExtractor/MobilenetV1/MobilenetV1/Conv2d_0/Conv2D_Fold | 10 | −7 | 10 | −6 |
| FeatureExtractor/MobilenetV1/MobilenetV1/Conv2d_10_depthwise/depthwise_Fold | 10 | −4 | 10 | −6 |
| FeatureExtractor/MobilenetV1/MobilenetV1/Conv2d_10_pointwise/Conv2D_Fold | 10 | −4 | 12 | −9 |
| FeatureExtractor/MobilenetV1/MobilenetV1/Conv2d_11_depthwise/depthwise_Fold | 10 | −4 | 10 | −6 |
| FeatureExtractor/MobilenetV1/MobilenetV1/Conv2d_11_pointwise/Conv2D_Fold | 10 | −5 | 12 | −10 |
| FeatureExtractor/MobilenetV1/MobilenetV1/Conv2d_12_depthwise/depthwise_Fold | 10 | −5 | 10 | −5 |
| FeatureExtractor/MobilenetV1/MobilenetV1/Conv2d_12_pointwise/Conv2D_Fold | 10 | −4 | 12 | −9 |
| FeatureExtractor/MobilenetV1/MobilenetV1/Conv2d_13_depthwise/depthwise_Fold | 10 | −4 | 10 | −5 |
| FeatureExtractor/MobilenetV1/MobilenetV1/Conv2d_13_pointwise/Conv2D_Fold | 10 | −4 | 12 | −9 |
| FeatureExtractor/MobilenetV1/MobilenetV1/Conv2d_1_depthwise/depthwise_Fold | 10 | −6 | 12 | −5 |
| FeatureExtractor/MobilenetV1/MobilenetV1/Conv2d_1_pointwise/Conv2D_Fold | 10 | −4 | 12 | −7 |
| FeatureExtractor/MobilenetV1/MobilenetV1/Conv2d_2_depthwise/depthwise_Fold | 8 | −4 | 10 | −6 |
| FeatureExtractor/MobilenetV1/MobilenetV1/Conv2d_2_pointwise/Conv2D_Fold | 8 | −4 | 10 | −8 |
| FeatureExtractor/MobilenetV1/MobilenetV1/Conv2d_3_depthwise/depthwise_Fold | 10 | −4 | 12 | −6 |
| FeatureExtractor/MobilenetV1/MobilenetV1/Conv2d_3_pointwise/Conv2D_Fold | 8 | −4 | 12 | −8 |
| FeatureExtractor/MobilenetV1/MobilenetV1/Conv2d_4_depthwise/depthwise_Fold | 8 | −4 | 8 | −6 |
| FeatureExtractor/MobilenetV1/MobilenetV1/Conv2d_4_pointwise/Conv2D_Fold | 8 | −4 | 10 | −8 |
| FeatureExtractor/MobilenetV1/MobilenetV1/Conv2d_5_depthwise/depthwise_Fold | 10 | −4 | 10 | −6 |
| FeatureExtractor/MobilenetV1/MobilenetV1/Conv2d_5_pointwise/Conv2D_Fold | 8 | −4 | 10 | −8 |
| FeatureExtractor/MobilenetV1/MobilenetV1/Conv2d_6_depthwise/depthwise_Fold | 8 | −4 | 10 | −6 |
| FeatureExtractor/MobilenetV1/MobilenetV1/Conv2d_6_pointwise/Conv2D_Fold | 10 | −4 | 10 | −8 |
| FeatureExtractor/MobilenetV1/MobilenetV1/Conv2d_7_depthwise/depthwise_Fold | 10 | −4 | 10 | −6 |
| FeatureExtractor/MobilenetV1/MobilenetV1/Conv2d_7_pointwise/Conv2D_Fold | 8 | −4 | 12 | −9 |
| FeatureExtractor/MobilenetV1/MobilenetV1/Conv2d_8_depthwise/depthwise_Fold | 10 | −4 | 10 | −6 |
| FeatureExtractor/MobilenetV1/MobilenetV1/Conv2d_8_pointwise/Conv2D_Fold | 10 | −4 | 12 | −9 |
| FeatureExtractor/MobilenetV1/MobilenetV1/Conv2d_9_depthwise/depthwise_Fold | 8 | −4 | 10 | −6 |
| FeatureExtractor/MobilenetV1/MobilenetV1/Conv2d_9_pointwise/Conv2D_Fold | 10 | −4 | 12 | −8 |

TABLE 5

| Layer | Input Bit | Input Exp | Wgt Bit | Wgt Exp |
|---|---|---|---|---|
| BoxPredictor_0/BoxEncodingPredictor/Conv2D | 8 | −4 | 8 | −7 |
| BoxPredictor_0/ClassPredictor/Conv2D | 8 | −4 | 8 | −7 |
| BoxPredictor_1/BoxEncodingPredictor/Conv2D | 8 | −3 | 8 | −8 |
| BoxPredictor_1/ClassPredictor/Conv2D | 8 | −3 | 8 | −7 |
| BoxPredictor_2/BoxEncodingPredictor/Conv2D | 8 | −3 | 8 | −8 |

TABLE 5-continued

| Layer | Input Bit | Input Exp | Wgt Bit | Wgt Exp |
|---|---|---|---|---|
| BoxPredictor_2/ClassPredictor/Conv2D | 8 | −3 | 8 | −8 |
| BoxPredictor_3/BoxEncodingPredictor/Conv2D | 8 | −3 | 8 | −8 |
| BoxPredictor_3/ClassPredictor/Conv2D | 8 | −3 | 8 | −8 |
| BoxPredictor_4/BoxEncodingPredictor/Conv2D | 8 | −3 | 8 | −8 |
| BoxPredictor_4/ClassPredictor/Conv2D | 8 | −3 | 8 | −8 |
| BoxPredictor_5/BoxEncodingPredictor/Conv2D | 8 | −3 | 8 | −9 |
| BoxPredictor_5/ClassPredictor/Conv2D | 8 | −3 | 8 | −7 |
| FeatureExtractor/MobilenetV1/Conv2d_13_pointwise_1_Conv2d_2_1 × 1_256/Conv2D_Fold | 8 | −3 | 8 | −9 |
| FeatureExtractor/MobilenetV1/Conv2d_13_pointwise_1_Conv2d_3_1 × 1_128/Conv2D_Fold | 8 | −3 | 8 | −9 |
| FeatureExtractor/MobilenetV1/Conv2d_13_pointwise_1_Conv2d_4_1 × 1_128/Conv2D_Fold | 8 | −3 | 8 | −8 |
| FeatureExtractor/MobilenetV1/Conv2d_13_pointwise_1_Conv2d_5_1 × 1_64/Conv2D_Fold | 8 | −3 | 8 | −8 |
| FeatureExtractor/MobilenetV1/Conv2d_13_pointwise_2_Conv2d_2_3 × 3_s2_512/Conv2D_Fold | 8 | −4 | 8 | −7 |
| FeatureExtractor/MobilenetV1/Conv2d_13_pointwise_2_Conv2d_3_3 × 3_s2_256/Conv2D_Fold | 8 | −4 | 8 | −6 |
| FeatureExtractor/MobilenetV1/Conv2d_13_pointwise_2_Conv2d_4_3 × 3_s2_256/Conv2D_Fold | 8 | −4 | 8 | −6 |
| FeatureExtractor/MobilenetV1/Conv2d_13_pointwise_2_Conv2d_5_3 × 3_s2_128/Conv2D_Fold | 8 | −4 | 8 | −6 |
| FeatureExtractor/MobilenetV1/MobilenetV1/Conv2d_0/Conv2D_Fold | 8 | −6 | 8 | −4 |
| FeatureExtractor/MobilenetV1/MobilenetV1/Conv2d_10_depthwise/depthwise_Fold | 8 | −4 | 8 | −5 |
| FeatureExtractor/MobilenetV1/MobilenetV1/Conv2d_10_pointwise/Conv2D_Fold | 8 | −3 | 8 | −7 |
| FeatureExtractor/MobilenetV1/MobilenetV1/Conv2d_11_depthwise/depthwise_Fold | 8 | −4 | 8 | −5 |
| FeatureExtractor/MobilenetV1/MobilenetV1/Conv2d_11_pointwise/Conv2D_Fold | 8 | −4 | 8 | −7 |
| FeatureExtractor/MobilenetV1/MobilenetV1/Conv2d_12_depthwise/depthwise_Fold | 8 | −4 | 8 | −4 |
| FeatureExtractor/MobilenetV1/MobilenetV1/Conv2d_12_pointwise/Conv2D_Fold | 8 | −4 | 8 | −7 |
| FeatureExtractor/MobilenetV1/MobilenetV1/Conv2d_13_depthwise/depthwise_Fold | 8 | −4 | 8 | −4 |
| FeatureExtractor/MobilenetV1/MobilenetV1/Conv2d_13_pointwise/Conv2D_Fold | 8 | −3 | 8 | −7 |
| FeatureExtractor/MobilenetV1/MobilenetV1/Conv2d_1_depthwise/depthwise_Fold | 8 | −4 | 8 | −3 |
| FeatureExtractor/MobilenetV1/MobilenetV1/Conv2d_1_pointwise/Conv2D_Fold | 8 | −3 | 8 | −5 |
| FeatureExtractor/MobilenetV1/MobilenetV1/Conv2d_2_depthwise/depthwise_Fold | 8 | −4 | 8 | −5 |
| FeatureExtractor/MobilenetV1/MobilenetV1/Conv2d_2_pointwise/Conv2D_Fold | 8 | −4 | 8 | −6 |
| FeatureExtractor/MobilenetV1/MobilenetV1/Conv2d_3_depthwise/depthwise_Fold | 8 | −4 | 8 | −4 |
| FeatureExtractor/MobilenetV1/MobilenetV1/Conv2d_3_pointwise/Conv2D_Fold | 8 | −3 | 8 | −6 |
| FeatureExtractor/MobilenetV1/MobilenetV1/Conv2d_4_depthwise/depthwise_Fold | 8 | −3 | 8 | −5 |
| FeatureExtractor/MobilenetV1/MobilenetV1/Conv2d_4_pointwise/Conv2D_Fold | 8 | −3 | 8 | −7 |
| FeatureExtractor/MobilenetV1/MobilenetV1/Conv2d_5_depthwise/depthwise_Fold | 8 | −3 | 8 | −4 |
| FeatureExtractor/MobilenetV1/MobilenetV1/Conv2d_5_pointwise/Conv2D_Fold | 8 | −3 | 8 | −7 |
| FeatureExtractor/MobilenetV1/MobilenetV1/Conv2d_6_depthwise/depthwise_Fold | 8 | −3 | 8 | −5 |
| FeatureExtractor/MobilenetV1/MobilenetV1/Conv2d_6_pointwise/Conv2D_Fold | 8 | −4 | 8 | −7 |
| FeatureExtractor/MobilenetV1/MobilenetV1/Conv2d_7_depthwise/depthwise_Fold | 8 | −4 | 8 | −5 |
| FeatureExtractor/MobilenetV1/MobilenetV1/Conv2d_7_pointwise/Conv2D_Fold | 8 | −3 | 8 | −8 |
| FeatureExtractor/MobilenetV1/MobilenetV1/Conv2d_8_depthwise/depthwise_Fold | 8 | −4 | 8 | −5 |
| FeatureExtractor/MobilenetV1/MobilenetV1/Conv2d_8_pointwise/Conv2D_Fold | 8 | −3 | 8 | −7 |
| FeatureExtractor/MobilenetV1/MobilenetV1/Conv2d_9_depthwise/depthwise_Fold | 8 | −4 | 8 | −5 |
| FeatureExtractor/MobilenetV1/MobilenetV1/Conv2d_9_pointwise/Conv2D_Fold | 8 | −4 | 8 | −7 |

Example DNN Accelerator

Figure 12:
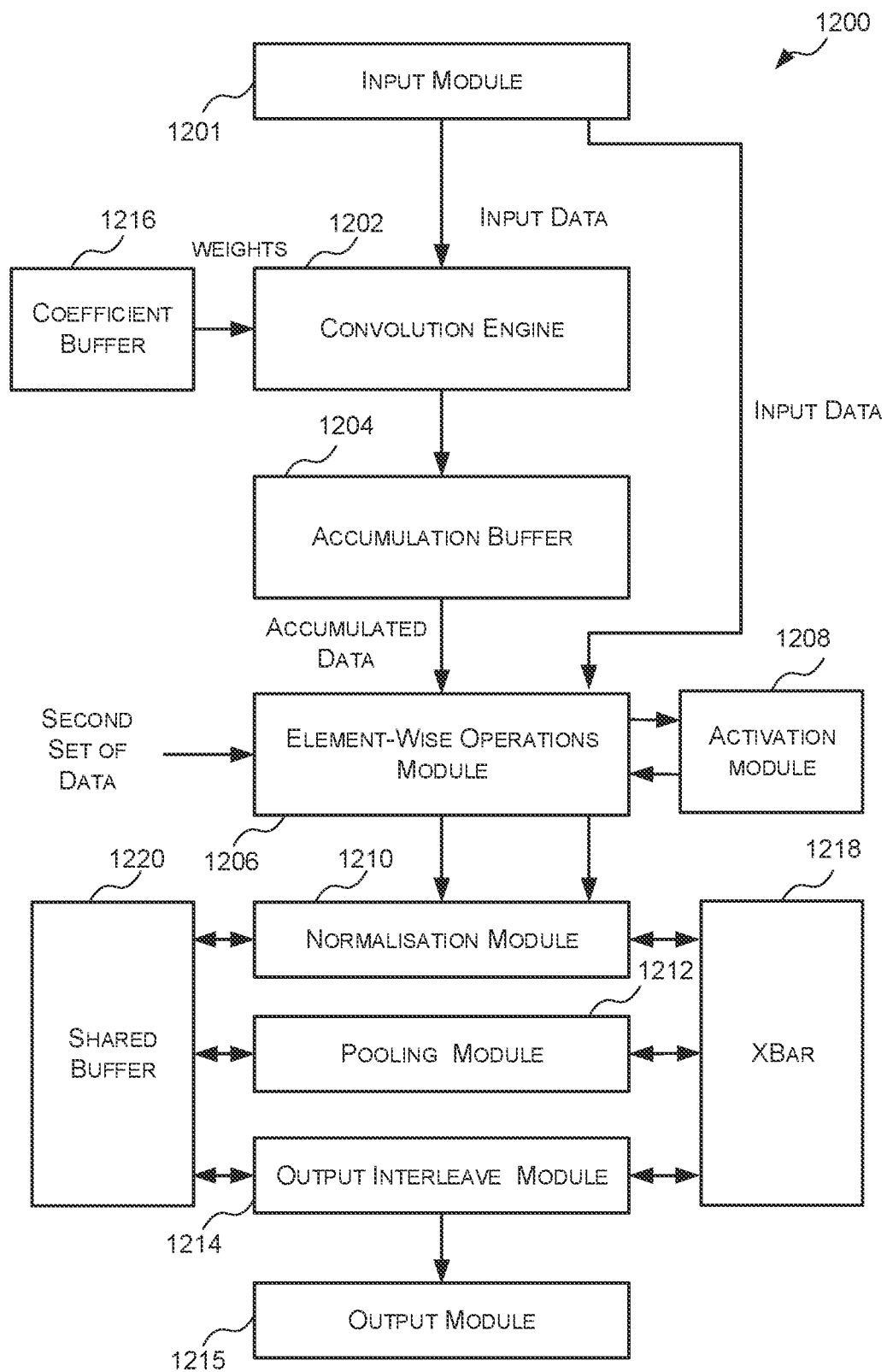
FIG. 12 is a block diagram of an example DNN accelerator.

Reference is now made to FIG. 12 which illustrates example hardware logic which can be configured to implement a DNN using the quantisation parameters identified in accordance with the method 500 of FIG. 5 or method 1000 of FIG. 10. Specifically FIG. 12 illustrates an example DNN accelerator 1200.

The DNN accelerator 1200 of FIG. 12 is configured to compute the output of a DNN through a series of hardware passes (which also may be referred to as processing passes) wherein during each pass the DNN accelerator receives at least a portion of the input data for a layer of the DNN and processes the received input data in accordance with that layer (and optionally in accordance with one or more following layers) to produce processed data. The processed data is either output to memory for use as input data for a subsequent hardware pass or output as the output of the DNN. The number of layers that the DNN accelerator can process during a single hardware pass may be based on the size of the data, the configuration of the DNN accelerator and the order of the layers. For example, where the DNN accelerator comprises hardware logic to perform each of the possible layer types a DNN that comprises a first convolution layer, a first activation layer, a second convolution layer, a second activation layer, and a pooling layer may be able to receive the initial DNN input data and process that input data according to the first convolution layer and the first activation layer in the first hardware pass and then output the output of the activation layer into memory, then in a second hardware pass receive that data from memory as the input and process that data according to the second convolution layer, the second activation layer, and the pooling layer to produce the output data for the DNN.

The example DNN accelerator 1200 of FIG. 12 comprises an input module 1201, a convolution engine 1202, an accumulation buffer 1204, an element-wise operations module 1206, an activation module 1208, a normalisation module 1210, a pooling module 1212, an output interleave module 1214 and an output module 1215. Each module or engine implements or processes all or a portion of one or more types of layers. Specifically, together the convolution engine 1202 and the accumulation buffer 1204 implement or process a convolution layer or a fully connected layer. The activation module 1208 processes or implements an activation layer. The normalisation module 1210 processes or implements a normalisation layer. The pooling module 1212 implements a pooling layer and the output interleave module 1214 processes or implements an interleave layer.

The input module 1201 is configured to receive the input data to be processed and provides it to a downstream module for processing.

The convolution engine 1202 is configured to perform a convolution operation on the received input data using the weights associated with a particular convolution layer. The weights for each convolution layer (which may be generated by the method 1000 of FIG. 10) of the DNN may be stored in a coefficient buffer 1216 as shown in FIG. 12 and the weights for a particular convolution layer may be provided to the convolution engine 1202 when that particular convolution layer is being processed by the convolution engine 1202. Where the DNN accelerator supports variable weight formats then the convolution engine 1202 may be configured to receive information indicating the format or formats of the weights of the current convolution layer being processed to allow the convolution engine to properly interpret and process the received weights.

The convolution engine 1202 may comprise a plurality of multipliers (e.g. 128) and a plurality of adders which add the result of the multipliers to produce a single sum. Although a single convolution engine 1202 is shown in FIG. 12, in other examples there may be multiple (e.g. 8) convolution engines so that multiple windows can be processed simultaneously. The output of the convolution engine 1202 is fed to the accumulation buffer 1204.

The accumulation buffer 1204 is configured to receive the output of the convolution engine and add it to the current contents of the accumulation buffer 1204. In this manner, the accumulation buffer 1204 accumulates the results of the convolution engine 1202 over several hardware passes of the convolution engine 1202. Although a single accumulation buffer 1204 is shown in FIG. 12, in other examples there may be multiple (e.g. 8, one per convolution engine) accumulation buffers. The accumulation buffer 1204 outputs the accumulated result to the element-wise operations module 1206 which may or may not operate on the accumulated result depending on whether an element-wise layer is to be processed during the current hardware pass.

The element-wise operations module 1206 is configured to receive either the input data for the current hardware pass (e.g. when a convolution layer is not processed in the current hardware pass) or the accumulated result from the accumulation buffer 1204 (e.g. when a convolution layer is processed in the current hardware pass). The element-wise operations module 1206 may either process the received input data or pass the received input data to another module (e.g. the activation module 1208 and/or or the normalisation module 1210) depending on whether an element-wise layer is processed in the current hardware pass and/or depending whether an activation layer is to be processed prior to an element-wise layer. When the element-wise operations module 1206 is configured to process the received input data the element-wise operations module 1206 performs an element-wise operation on the received data (optionally with another data set (which may be obtained from external memory)). The element-wise operations module 1206 may be configured to perform any suitable element-wise operation such as, but not limited to add, multiply, maximum, and minimum. The result of the element-wise operation is then provided to either the activation module 1208 or the normalisation module 1210 depending on whether an activation layer is to be processed subsequent the element-wise layer or not.

The activation module 1208 is configured to receive one of the following as input data: the original input to the hardware pass (via the element-wise operations module 1206) (e.g. when a convolution layer is not processed in the current hardware pass); the accumulated data (via the element-wise operations module 1206) (e.g. when a convolution layer is processed in the current hardware pass and either an element-wise layer is not processed in the current hardware pass or an element-wise layer is processed in the current hardware pass but follows an activation layer). The activation module 1208 is configured to apply an activation function to the input data and provide the output data back to the element-wise operations module 1206 where it is forwarded to the normalisation module 1210 directly or after the element-wise operations module 1206 processes it. In some cases, the activation function that is applied to the data received by the activation module 1208 may vary per activation layer. In these cases, information specifying one or more properties of an activation function to be applied for each activation layer may be stored (e.g. in memory) and the relevant information for the activation layer processed in a particular hardware pass may be provided to the activation module 1208 during that hardware pass.

In some cases, the activation module 1208 may be configured to store, in entries of a lookup table, data representing the activation function. In these cases, the input data may be used to lookup one or more entries in the lookup table and output values representing the output of the activation function. For example, the activation module 1208 may be configured to calculate the output value by interpolating between two or more entries read from the lookup table.

In some examples, the activation module 1208 may be configured to operate as a Rectified Linear Unit (ReLU) by implementing a ReLU function. In a ReLU function, the output element $y_{i,j,k}$ is calculated by identifying a maximum value as set out in equation (33) wherein for x values less than 0, y=0:

$$y_{i,j,k}=f(x_{i,j,k})=\max\{0,x_{i,j,k}\} \tag{33}$$

In other examples, the activation module 1208 may be configured to operate as a Parametric Rectified Linear Unit (PReLU) by implementing a PReLU function. The PReLU function performs a similar operation to the ReLU function. Specifically, where $w_1$, $w_2$, $b_1$, $b_2 \in \mathbb{R}$ are constants, the PReLU is configured to generate an output element $y_{i,j,k}$ as set out in equation (34):

$$y_{i,j,k}=f(x_{i,j,k};w_1,w_2,b_1,b_2)=\max\{(w_1*x_{i,j,k}+b_1),(w_2*x_{i,j,k}+b_2)\} \tag{34}$$

The normalisation module 1210 is configured to receive one of the following as input data: the original input data for the hardware pass (via the element-wise operations module 1206) (e.g. when a convolution layer is not processed in the current hardware pass and neither an element-wise layer nor an activation layer is processed in the current hardware pass); the accumulation output (via the element-wise operations module 1206) (e.g. when a convolution layer is processed in the current hardware pass and neither an element-wise layer nor an activation layer is processed in the current hardware pass); and the output data of the element-wise operations module and/or the activation module. The normalisation module 1210 then performs a normalisation function on the received input data to produce normalised data. In some cases, the normalisation module 1210 may be configured to perform a Local Response Normalisation (LRN) Function and/or a Local Contrast Normalisation (LCN) Function. However, it will be evident to a person of skill in the art that these are examples only and that the normalisation module 1210 may be configured to implement any suitable normalisation function or functions. Different normalisation layers may be configured to apply different normalisation functions.

The pooling module 1212 may receive the normalised data from the normalisation module 1210 or may receive the input data to the normalisation module 1210 via the normalisation module 1210. In some cases, data may be transferred between the normalisation module 1210 and the pooling module 1212 via an XBar 1218. The term "XBar" is used herein to refer to a simple hardware module that contains routing logic which connects multiple modules together in a dynamic fashion. In this example, the XBar may dynamically connect the normalisation module 1210, the pooling module 1212 and/or the output interleave module 1214 depending on which layers will be processed in the current hardware pass. Accordingly, the XBar may receive information each pass indicating which modules 1210, 1212, 1214 are to be connected.

The pooling module 1212 is configured to perform a pooling function, such as, but not limited to, a max or mean function, on the received data to produce pooled data. The purpose of a pooling layer is to reduce the spatial size of the representation to reduce the number of parameters and computation in the network, and hence to also control overfitting. In some examples, the pooling operation is performed over a sliding window that is defined per pooling layer.

The output interleave module 1214 may receive the normalised data from the normalisation module 1210, the input data to the normalisation function (via the normalisation module 1210), or the pooled data from the pooling module 1212. In some cases, the data may be transferred between the normalisation module 1210, the pooling module 1212 and the output interleave module 1214 via an XBar 1218. The output interleave module 1214 is configured to perform a rearrangement operation to produce data that is in a predetermined order. This may comprise sorting and/or transposing the received data. The data generated by the last of the layers is provided to the output module 1215 where it is converted to the desired output format for the current hardware pass.

The normalisation module 1210, the pooling module 1212, and the output interleave module 1214 may each have access to a shared buffer 1220 which can be used by these modules 1210, 1212 and 1214 to write data to and retrieve data from. For example, the shared buffer 1220 may be used by these modules 1210, 1212, 1214 to rearrange the order of the received data or the generated data. For example, one or more of these modules 1210, 1212, 1214 may be configured to write data to the shared buffer 1220 and read the same data out in a different order. In some cases, although each of the normalisation module 1210, the pooling module 1212 and the output interleave module 1214 have access to the shared buffer 1220, each of the normalisation module 1210, the pooling module 1212 and the output interleave module 1214 may be allotted a portion of the shared buffer 1220 which only they can access. In these cases, each of the normalisation module 1210, the pooling module 1212 and the output interleave module 1214 may only be able to read data out of the shared buffer 1220 that they have written into the shared buffer 1220.

The modules of the DNN accelerator 1200 that are used or active during any hardware pass are based on the layers that are processed during that hardware pass. In particular, only the modules or components related to the layers processed during the current hardware pass are used or active. As described above, the layers that are processed during a particular hardware pass is determined (typically in advance, by, for example, a software tool) based on the order of the layers in the DNN and optionally one or more other factors (such as the size of the data). For example, in some cases the DNN accelerator may be configured to perform the processing of a single layer per hardware pass unless multiple layers can be processed without writing data to memory between layers. For example, if a first convolution layer is immediately followed by a second convolution layer each of the convolution layers would have to be performed in a separate hardware pass as the output data from the first hardware convolution needs to be written out to memory before it can be used as an input to the second. In each of these hardware passes only the modules, components or engines relevant to a convolution layer, such as the convolution engine 1202 and the accumulation buffer 1204, may be used or active.

Although the DNN accelerator 1200 of FIG. 12 illustrates a particular order in which the modules, engines etc. are arranged and thus how the processing of data flows through the DNN accelerator, it will be appreciated that this is an example only and that in other examples the modules, engines may be arranged in a different manner. Furthermore, other hardware logic (e.g. other DNN accelerators) may implement additional or alternative types of DNN layers and thus may comprise different modules, engines etc.

Figure 13:
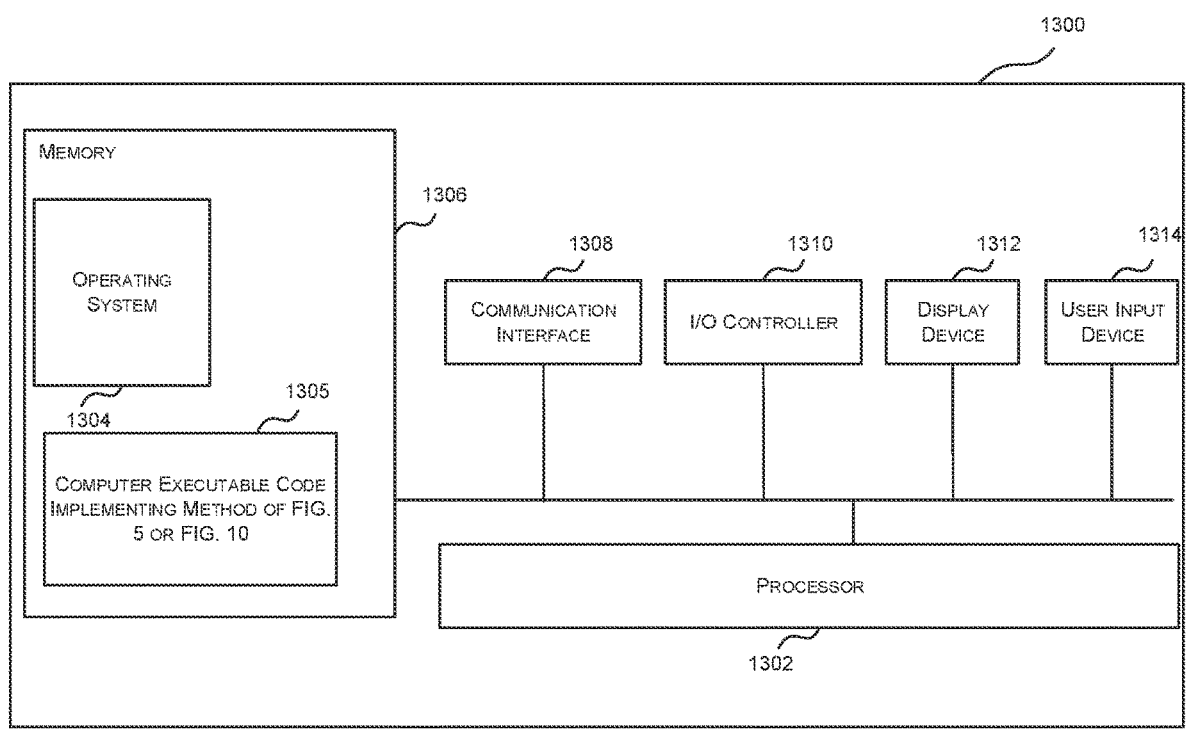
FIG. 13 is a block diagram of an example computing-based device.

FIG. 13 illustrates various components of an exemplary general purpose computing-based device 1300 which may be implemented as any form of a computing and/or electronic device, and in which embodiments of the methods 500, 1000 of FIGS. 5 and 10 described above may be implemented.

Computing-based device 1300 comprises one or more processors 1302 which may be microprocessors, controllers or any other suitable type of processors for processing computer executable instructions to control the operation of the device in order to assess the performance of an integrated circuit defined by a hardware design in completing a task. In some examples, for example where a system on a chip architecture is used, the processors 1302 may include one or more fixed function blocks (also referred to as accelerators) which implement a part of the method of determining the fixed point number format for representing a set of values input to, or output from, a layer of a DNN in hardware (rather than software or firmware). Platform software comprising an operating system 1304 or any other suitable platform software may be provided at the computing-based device to enable application software, such as computer executable code 1305 for implementing one or more of the methods 500, 1000 of FIGS. 5 and 10, to be executed on the device.

The computer executable instructions may be provided using any computer-readable media that is accessible by computing based device 1300. Computer-readable media may include, for example, computer storage media such as memory 1306 and communications media. Computer storage media (i.e. non-transitory machine readable media), such as memory 1306, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g.

memory 1306) is shown within the computing-based device 1300 it will be appreciated that the storage may be distributed or located remotely and accessed via a network or other communication link (e.g. using communication interface 1308).

The computing-based device 1300 also comprises an input/output controller 1310 arranged to output display information to a display device 1312 which may be separate from or integral to the computing-based device 1300. The display information may provide a graphical user interface. The input/output controller 1310 is also arranged to receive and process input from one or more devices, such as a user input device 1314 (e.g. a mouse or a keyboard). In an embodiment the display device 1312 may also act as the user input device 1314 if it is a touch sensitive display device. The input/output controller 1310 may also output data to devices other than the display device, e.g. a locally connected printing device (not shown in FIG. 13).

Figure 14:
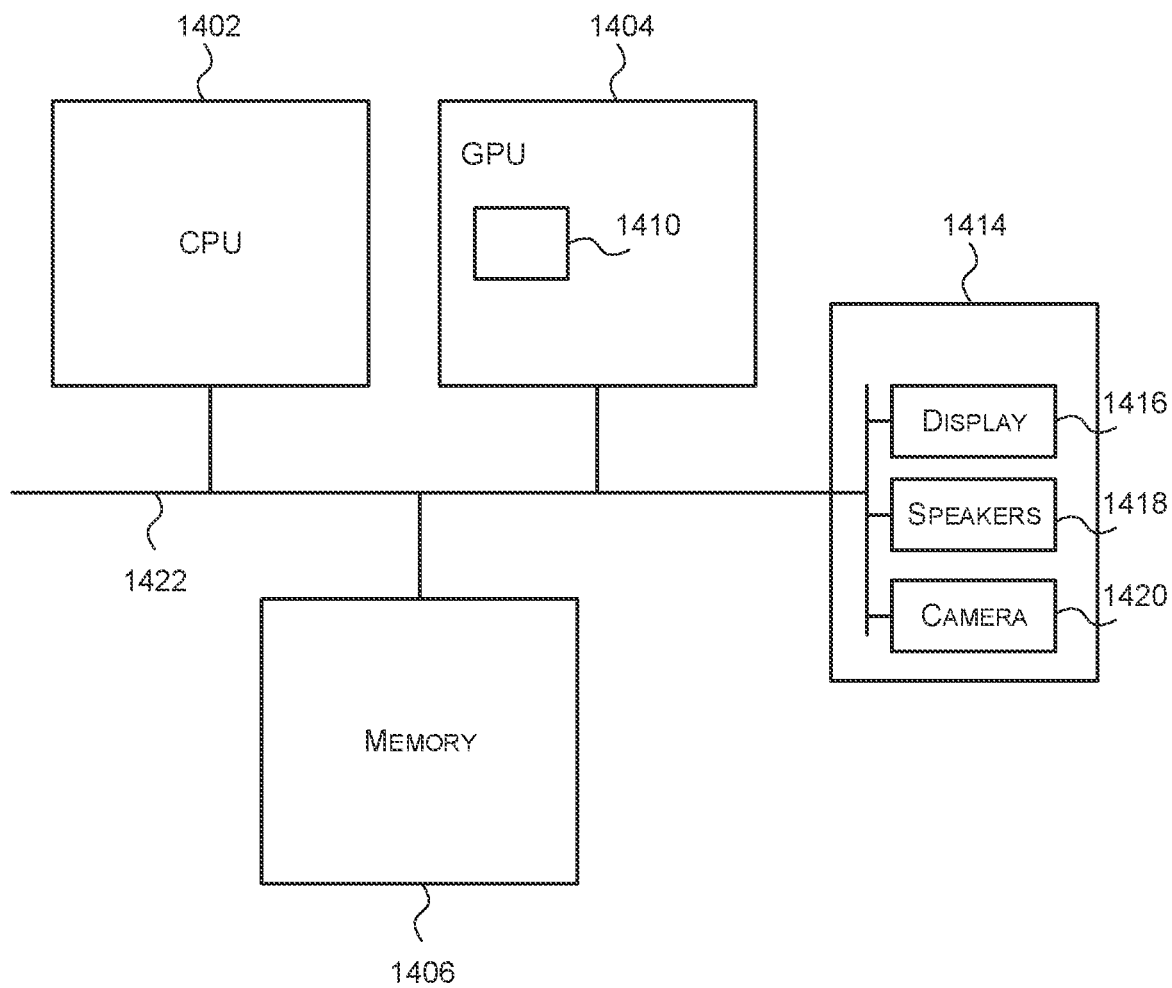
FIG. 14 is a block diagram of an example computer system in which a DNN accelerator may be implemented.

FIG. 14 shows a computer system in which the hardware logic (e.g. DNN accelerator) configurable to implement a DNN described herein may be implemented. The computer system comprises a CPU 1402, a GPU 1404, a memory 1406 and other devices 1414, such as a display 1416, speakers 1418 and a camera 1420. Hardware logic configurable to implement a DNN 1410 (e.g. the DNN accelerator 1200 of FIG. 12) may be implemented on the GPU 1404, as shown in FIG. 14. The components of the computer system can communicate with each other via a communications bus 1422. In other examples, the hardware logic configurable to implement a DNN 1410 may be implemented independent from the CPU or the GPU and may have a separate connection to the communications bus 1422. In some examples, there may not be a GPU and the CPU may provide control information to the hardware logic configurable to implement a DNN 1410.

The DNN accelerator 1200 of FIG. 12 is shown as comprising a number of functional blocks. This is schematic only and is not intended to define a strict division between different logic elements of such entities. Each functional block may be provided in any suitable manner. It is to be understood that intermediate values described herein as being formed by a DNN accelerator or a processing module need not be physically generated by the DNN accelerator or the processing module at any point and may merely represent logical values which conveniently describe the processing performed by the DNN accelerator or the processing module between its input and output.

The hardware logic configurable to implement a DNN (e.g. the DNN accelerator 1200 of FIG. 12) described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture hardware logic configurable to implement a DNN (e.g. DNN accelerator) described herein. An integrated circuit definition dataset may be, for example, an integrated circuit description.

Therefore, there may be provided a method of manufacturing, at an integrated circuit manufacturing system, hardware logic configurable to implement a DNN (e.g. DNN accelerator 1200 of FIG. 12) as described herein. Furthermore, there may be provided an integrated circuit definition dataset that, when processed in an integrated circuit manufacturing system, causes the method of manufacturing hardware logic configurable to implement a DNN (e.g. DNN accelerator 1200 of FIG. 12) to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture hardware logic configurable to implement a DNN (e.g. DNN accelerator) will now be described with respect to FIG. 15.

Figure 15:
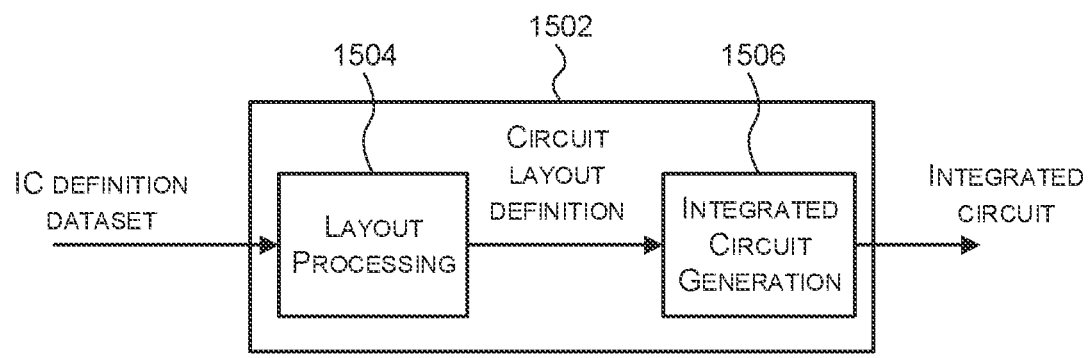
FIG. 15 is a block diagram of an example integrated circuit manufacturing system for generating an integrated circuit embodying a DNN accelerator as described herein.

FIG. 15 shows an example of an integrated circuit (IC) manufacturing system 1502 which is configured to manufacture hardware logic configurable to implement a DNN (e.g. DNN accelerator) as described in any of the examples herein. In particular, the IC manufacturing system 1502 comprises a layout processing system 1504 and an integrated circuit generation system 1506. The IC manufacturing system 1502 is configured to receive an IC definition dataset (e.g. defining hardware logic configurable to implement a DNN (e.g. DNN accelerator) as described in any of the examples herein), process the IC definition dataset, and generate an IC according to the IC definition dataset (e.g. which embodies hardware logic configurable to implement a DNN (e.g. DNN accelerator) as described in any of the examples herein). The processing of the IC definition dataset configures the IC manufacturing system 1502 to manufacture an integrated circuit embodying hardware logic configurable to implement a DNN (e.g. DNN accelerator) as described in any of the examples herein.

The layout processing system 1504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1504 has determined the circuit layout it may output a circuit layout definition to the IC generation system 1506. A circuit layout definition may be, for example, a circuit layout description.

The IC generation system 1506 generates an IC according to the circuit layout definition, as is known in the art. For example, the IC generation system 1506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1506 may be in the form of computer-readable code which the IC generation system 1506 can use to form a suitable mask for use in generating an IC.

The different processes performed by the IC manufacturing system 1502 may be implemented all in one location, e.g. by one party. Alternatively, the IC manufacturing system 1502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture hardware logic configurable to implement a DNN (e.g. DNN accelerator) without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 15 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 15, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method to configure hardware to implement a Deep Neural Network (DNN), the method comprising, in at least one processor:
(a) determining an output of a model of the DNN in response to training data, the model of the DNN comprising a quantisation block configured to transform a set of values input to a layer of the DNN prior to the model processing the set of values in accordance with the layer, the transformation of the set of values simulating quantisation of the set of values to a fixed point number format defined by one or more quantisation parameters;
(b) determining an error metric for the DNN, the error metric being a quantitative measure of an error in the determined output;
(c) determining a size metric for the DNN, the size metric being proportional to a size of the DNN based on the one or more quantisation parameters;
(d) back-propagating a derivative of the error metric to at least one of the one or more quantisation parameters to generate a gradient of the error metric for the at least one of the one or more quantisation parameters;
(e) determining a gradient of the size metric for the at least one of the one or more quantisation parameters;
(f) determining a final gradient for the at least one of the one or more quantisation parameters based on the gradient of the error metric and the gradient of the size metric for the at least one of the one or more quantisation parameters;
(g) adjusting the at least one of the one or more quantisation parameters based on the final gradient for the at least one of the one or more quantisation parameters; and
(h) configuring the hardware to implement the DNN using the at least one of the one or more adjusted quantisation parameters by configuring the hardware to receive and process the set of values in accordance with the at least one of the one or more adjusted quantisation parameters.

2. The method of claim 1, wherein adjusting a quantisation parameter based on the final gradient for that quantisation parameter comprises adding a value to the quantisation parameter based on the final gradient for that quantisation parameter to generate a modified quantisation parameter.

3. The method of claim 2, wherein adjusting the quantisation parameter based on the final gradient for that quantisation parameter further comprises quantising the modified quantisation parameter to a nearest integer in a set of integers, or simulating the quantisation of the modified quantisation parameter to the nearest integer in the set of integers.

4. The method of claim 3, wherein quantising the modified quantisation parameter to the nearest integer in the set of integers comprises rounding the modified quantisation parameter to the nearest integer in the set of integers.

5. The method of claim 3, wherein simulating the quantisation of the modified quantisation parameter to the nearest integer in the set of integers comprises adding a random number between $-\alpha$ and $\alpha$ to the modified quantisation parameter, wherein $\alpha$ is half a distance between a closest integer of the set of integers that is lower than the modified quantised parameter and a closest integer of the set of integers that is higher than the modified quantisation parameter.

6. The method of claim 5, wherein simulating the quantisation of the modified quantisation parameter to the nearest integer of the set of integers further comprises, subsequent to adding the random number to the modified quantisation parameter, rounding the modified quantisation parameter to the nearest integer in the set of integers.

7. The method of claim 3, wherein simulating the quantisation of the modified quantisation parameter to the nearest integer of the set of integers comprises:
selecting a highest integer in the set of integers that is less than or equal to the modified quantised parameter to generate a floored modified quantisation parameter; and
adding a random value between 0 and c to the floored modified quantisation parameter, wherein c is a distance between a closest integer in the set of integers that is lower than the modified quantisation parameter and a closest integer in the set of integers that is higher than the modified quantisation parameter.

8. The method of claim 1, further comprising repeating (a), (b), (c), (d), (e), (f) and (g) with the at least one of the one or more adjusted quantisation parameters.

9. The method of claim 8, wherein adjusting a quantisation parameter based on the final gradient for that quantisation parameter comprises adding a value to the quantisation parameter based on the final gradient for that quantisation parameter to generate a modified quantisation parameter; and adjusting the quantisation parameter in a subsequent iteration of (g) comprises adding a value to the modified quantisation parameter of the previous iteration based on the final gradient for that quantisation parameter.

10. The method of claim 9, wherein the modified quantisation parameter is in a floating point number format.

11. The method of claim 1, wherein the fixed point number format is defined by a plurality of quantisation parameters comprising a bit width and an exponent.

12. The method of claim 11, wherein the quantisation block is configured to transform a value of the set of values input to the layer by:
thresholding the value to a range of representable values for the fixed point number format for the quantisation block to generate a thresholded value, and rounding the thresholded value to the nearest $exp^{th}$ power of 2, wherein exp is the exponent of the fixed point number format for the quantisation block; or
rounding the value to the nearest $exp^{th}$ power of 2 to generate a rounded value, and thresholding the rounded value to a range of representable values for the fixed point number format for the quantisation block.

13. The method of claim 12, wherein the quantisation block is further configured to transform the value of the set of values input to the layer by adding a random number between $-\alpha$ and $\alpha$ to one of the value, the thresholded value and the rounded value, wherein $\alpha$ is half a distance between representable numbers in the fixed point number format for the quantisation block.

14. The method of claim 1, wherein the quantisation block is configured to transform a value of the set of values input to the layer by:
(i) thresholding the value to a range of representable values for the fixed point number format for the quantisation block to generate a thresholded value; and
adding a random number between $-\alpha$ and $\alpha$ to the thresholded value, wherein $\alpha$ is half a distance between representable numbers in the fixed point number format for the quantisation block; or (ii) adding a random number between $-\alpha$ and $\alpha$ to the value to generate a randomized value; and thresholding the randomized value to a range of representable values for the fixed point number format for the quantisation block.

15. The method of claim 1, wherein the quantisation block is configured to transform a value of the set of values input to the layer by:

thresholding the value to a range of representable values for the fixed point number format for the quantisation block to generate a thresholded value;

determining a floor of the thresholded value to generate a floored value; and adding a random value between 0 and c to the floored value, wherein c is a distance between representable numbers in the fixed point number format for the quantisation block.

16. The method of claim 1, wherein the DNN comprises at least one layer in which the input data for the layer is processed in accordance with a plurality of weights, and the method further comprises:

back-propagating the error metric to one or more of the weights to generate a gradient of the error metric for each of the one or more weights; and adjusting at least one of the one or more of the weights based on the gradient of the error metric for the at least one of the one or more of the weights.

17. The method of claim 1, wherein determining a final gradient for the at least one of the one or more quantisation parameters comprises generating a weighted sum of the gradient of the error metric for the at least one of the one or more quantisation parameters and the gradient of the size metric for the at least one of the one or more quantisation parameters.

18. The method of claim 1, wherein the hardware is a DNN accelerator.

19. A non-transitory computer readable storage medium having stored thereon computer readable instructions that, when executed at a computer system, cause the computer system to perform the method as set forth in claim 1.

20. A computing-based device to configure hardware to implement a Deep Neural Network (DNN), the computing-based device comprising:

at least one processor; and memory coupled to the at least one processor, the memory comprising:

computer readable code that when executed by the at least one processor causes the at least one processor to:

(a) determine an output of a model of the DNN in response to training data, the model of the DNN comprising a quantisation block configured to transform a set of values input to a layer of the DNN prior to the model processing the set of values in accordance with the layer, the transformation of the set of values simulating quantisation of the set of values to a fixed point number format defined by one or more quantisation parameters;

(b) determine an error metric for the DNN, the error metric being a quantitative measure of an error in the determined output;

(c) determine a size metric for the DNN, the size metric being proportional to a size of the DNN based on the one or more quantisation parameters;

(d) back-propagate a derivative of the error metric to at least one of the one or more quantisation parameters to generate a gradient of the error metric for the at least one of the one or more quantisation parameters;

(e) determine a gradient of the size metric for the at least one of the one or more quantisation parameters;

(f) determine a final gradient for the at least one of the one or more quantisation parameters based on the gradient of the error metric and the gradient of the size metric for the at least one of the one or more quantisation parameters;

(g) adjust the at least one of the one or more quantisation parameters based on the final gradient for the at least one of the one or more quantisation parameters; and (h) configure the hardware to implement the DNN using the at least one of the one or more adjusted quantisation parameters by configuring the hardware to receive and process the set of values in accordance with the at least one of the one or more adjusted quantisation parameters.

* * * * *